United States Patent
Masuda

(10) Patent No.: US 8,654,656 B2
(45) Date of Patent: Feb. 18, 2014

(54) COMMUNICATION DEVICE, METHOD, INTEGRATED CIRCUIT, SYSTEM, AND PROGRAM

(75) Inventor: Yoichi Masuda, Osaka (JP)

(73) Assignee: Panasonic Corporation, Osaka (JP)

( * ) Notice: Subject to any disclaimer, the term of this patent is extended or adjusted under 35 U.S.C. 154(b) by 283 days.

(21) Appl. No.: 13/147,005

(22) PCT Filed: Nov. 29, 2010

(86) PCT No.: PCT/JP2010/006929
§ 371 (c)(1),
(2), (4) Date: Jul. 29, 2011

(87) PCT Pub. No.: WO2011/065019
PCT Pub. Date: Jun. 3, 2011

(65) Prior Publication Data
US 2011/0286339 A1 Nov. 24, 2011

(30) Foreign Application Priority Data
Nov. 30, 2009 (JP) ................... 2009-271374

(51) Int. Cl.
*H04W 4/00* (2009.01)
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ............................ 370/248; 370/328; 370/329

(58) Field of Classification Search
None
See application file for complete search history.

(56) References Cited

U.S. PATENT DOCUMENTS

| 6,297,729 B1* | 10/2001 | Abali et al. ............... 340/12.34 |
| 2007/0165569 A1* | 7/2007 | Kaminski et al. ............ 370/329 |
| 2008/0016190 A1* | 1/2008 | Halasz ......................... 709/220 |
| 2009/0110096 A1 | 4/2009 | Koga et al. |
| 2010/0074304 A1* | 3/2010 | Flammer, III ................ 375/134 |
| 2010/0109862 A1* | 5/2010 | Sharma ........................ 340/538 |

FOREIGN PATENT DOCUMENTS

| JP | 2003-259434 | 9/2003 |
| JP | 2005-109800 | 4/2005 |
| JP | 2007-49531 | 2/2007 |
| JP | 2009-105812 | 5/2009 |
| JP | 2009-130585 | 6/2009 |

OTHER PUBLICATIONS

International Search Report issued Dec. 28, 2010 in corresponding International Application No. PCT/JP2010/006929.

* cited by examiner

*Primary Examiner* — Faruk Hamza
*Assistant Examiner* — Diane Lo
(74) *Attorney, Agent, or Firm* — Wenderoth, Lind & Ponack, L.L.P.

(57) ABSTRACT

A communication device includes a transmission path state determination unit; a communication unit and a topology determination unit configured to classify a destination device into a first group when a detected transmission path characteristic satisfies a criteria, and to classify a destination device into a second group when the detected transmission path characteristic does not satisfy the criteria. Additionally, a frequency band control unit is configured to select a first frequency band and a second frequency band higher than the first frequency band based on whether the destination device is classified into the first group, or into the second group, the first and second frequency bands being obtained by dividing an entire frequency band.

15 Claims, 18 Drawing Sheets

FIG. 6

| Communication destination | Determination result |
|---|---|
| A2 | Same |
| A3 | Same |
| A4 | Same |
| B1 | Same |
| B2 | Different |

| Communication destination \ Communication device | A1 | A2 | A3 | A4 |
|---|---|---|---|---|
| A1 |  | Same | Same | Same |
| A2 | Same |  | Same | Same |
| A3 | Same | Same |  | Same |
| A4 | Same | Same | Same |  |
| B1 | Different | Different | Different | Different |
| B2 | Different | Different | Different | Different |

209b

COMMUNICATION DEVICE, METHOD, INTEGRATED CIRCUIT, SYSTEM, AND PROGRAM

BACKGROUND OF INVENTION

1. Technical Field

The present invention relates to a communication device and a communication method which select one or more bands, as a frequency band to be used, from a plurality of frequency bands, and performs communication in the selected bands.

2. Background Art

Examples of conventional communication methods which select a frequency band to be used from a plurality of frequency bands include a method using a pre-assigned fixed frequency band, or a method using a frequency band which is determined to be available after checking the signal level of each frequency band to determine whether it is used by any other terminal.

Another example is a method which detects both of the availability and the transmission path state of each frequency band and selects a favorable channel to perform communication (for example, see PTL 1).

FIG. 3 shows the configuration of the conventional communication device (radio communication device) described in PTL 1, which performs radio communication.

In the communication device in FIG. 3, a transmission path state determination unit 301 detects the availability and the transmission path state of each frequency band. A channel control unit 302 then selects a favorable channel based on the both of the availability and the transmission path state of each frequency band, which are detected by the transmission path state determination unit 301, and performs communication via the selected channel.

CITATION LIST

Patent Literature

[PTL 1]
Japanese Unexamined Patent Application Publication No. 2003-259434

SUMMARY OF INVENTION

However, with the above-mentioned conventional configuration, the following problem may arise in the case such as in power line communication using certain frequency bands in which a specific frequency band tends to have a better transmission characteristic than that of the other frequency bands. When a frequency band to be used is selected based on the transmission path state, the selected band tends to be congested in a specific frequency band, and a load cannot be distributed over the frequency bands, thus the overall communication efficiency decreases.

The present invention has been made in view of the above-mentioned existing problem, and an object of the present invention is to provide a communication device and a method of communication for preventing the overall communication efficiency from to being reduced, and increasing the overall communication efficiency.

Another object of the present invention includes to solve a problem which occurs in the case where communication (see power line communication 7 shown in FIG. 4) is performed using the equipment (see power line 107 of FIG. 2) installed for the use other than the communication (such as supply of power) as the communication media in the communication (see the power line 107). That is to say, another object includes to provide a communication device capable of increasing the quality of the communication by preventing the quality from being deteriorated (see a significant difference 207$h$2 in received power 82 in FIG. 14 in the communication through a device) due to communication through a device such as a breaker (see breaker 401$b$).

Also, another object includes to provide a communication device capable of eliminating the reduction in the quality as in the case described above, and improving the quality so that a relatively significant improvement can be achieved.

In order to solve the existing problems, the communication device according to an aspect of the present invention includes: a detection unit configured to detect a transmission path characteristic in communication with each of other communication devices; a determination unit configured to classify a communication device out of the other communication devices into a first group when the detected transmission path characteristic satisfies a predetermined criterion (see the difference in the received power 207$h$ in FIG. 14), and to classify a communication device out of the other communication devices into a second group when the detected transmission path characteristic does not satisfy the predetermined criterion; a control unit configured to select a frequency band used for communication with the other communication device that is a communication destination, from among a first frequency band and a second frequency band higher than the first frequency band, based on whether the other communication device that is a communication destination is classified into the first group or into the second group, the first and second frequency bands being obtained by dividing an entire frequency band (see an entire band 101A in FIG. 16) which can be used for communication; and a communication unit configured to perform communication with the other communication device that is a communication destination using the selected frequency band (for example, the second high-frequency band).

In this manner, a frequency band to be used is selected based on the classification.

As suggested above, the second frequency band has, for example, a worse transmission path characteristic than that of the first frequency band. That is to say, the central frequency of the second frequency band, for example, may be higher than that of the first frequency band. For example, neither portion of the second frequency band may be included in the first frequency band, thus the intersection of the first frequency band and the second frequency band may be empty.

For each of other communication devices, transmission path characteristic may be detected and the communication device may be classified using the detected transmission path characteristic.

Also, two respective transmission path characteristics of the first and second frequency bands used between the present communication device and other communication devices may be detected and the both detected transmission path characteristics (for example, see the difference 207$h$ in FIG. 14) may be used to classify the other communication devices.

Alternatively, each of a plurality of other communication devices (see communication devices such as devices 1A3 and 1B2 in FIG. 4) may be classified, and based on a certain group classified by the classification (result of the classification), an appropriate frequency band (for example, low band 101L in FIG. 16) corresponding to the certain group (for example, the second group 1G2) may be selected as the frequency band to be used for communication with the other communication devices.

Also, the method of communication according to an aspect of the present invention includes: detecting a transmission path characteristic in communication performed by a communication device with each of other communication devices except the communication device; classifying a communication device out of the other communication devices into a first group when the detected transmission path characteristic satisfies a predetermined criterion, and classifying a communication device out of the other communication devices into a second group when the detected transmission path characteristic does not satisfy the predetermined criterion; selecting a frequency band used for communication with the other communication devices that is a communication destination, from among a first frequency band and a second frequency band higher than the first frequency band, based on whether the other communication device that is a communication destination is classified into the first group or into the second group, the first and second frequency bands being obtained by dividing an entire frequency band which can be used for communication; and performing communication with the other communication device that is a communication destination using the selected frequency band.

By the above-mentioned configuration, the frequency band used for communication with the terminal of the communication-destination is controlled depending on whether the communication-destination terminal (other communication device which is the communication destination) as one of the plurality of terminals (the plurality of other communication devices) is classified as either the first group or the second group. Thereby, communication congestion in the first frequency band can be prevented that occurs when the transmission path characteristic in the first relatively low-frequency band, and the transmission path characteristic in the second relatively high-frequency band are simply compared and the frequency band having better transmission path characteristic is selected. Accordingly, communication having an improved transmission efficiency can be achieved that effectively uses both the first frequency band and the second frequency band.

Also, compared with the case where all the terminals perform communication using both the first frequency band and the second frequency band, a reduction in transmission efficiency (see e.g., the significant difference 207h2 in FIG. 14) can be suppressed where the reduction in transmission efficiency is caused by the communication performed in a frequency band including the second frequency band between terminals having (extremely) poor transmission path characteristics in the second high-frequency band (for example, between communication devices 1A1 and 1B2 in FIG. 4 with received power 822 shown in FIG. 14 in the communication). Accordingly, a high transmission efficiency can be achieved so that the quality of the communication can be improved.

In this manner, for example, the transmission characteristics of the both frequency bands are compared and a different frequency band is used efficiently according to the transmission characteristics. By this operation, the overall communication efficiency is prevented from being reduced, thus can be improved.

In short, the communication performed is, for example, power line communication via a power line where the equipment (power line) installed for the use other than the communication (such as supply of power) is used as the communication media in the communication.

In other words, the communication performed may be, for example, power line communication via a direct-current power line, which is not in commonly used today but may be commonly used in the near future.

Also, the communication performed may be, for example, communication via a coaxial cable connected to a television which is installed for the purpose of making the television operate properly and is used as the communication media in the communication.

For example, the first group includes one or more other communication devices which perform communication not through a through device such as a circuit-breaker in power line communication, while the second group includes one or more other communication devices which perform communication through a through device.

According to the communication device of the present invention, the frequency bands can be utilized efficiently by selecting a frequency band to be used for the communication according to the characteristic of each frequency band for each of the other communication devices as the communication destination, thus the overall communication efficiency can be improved.

Also, the quality of the communication can be improved and a relatively significant improvement can be achieved.

BRIEF DESCRIPTION OF DRAWINGS

FIG. 6 is a table showing an exemplary topology table 209.

FIG. 10 is a table showing an exemplary topology table of peripheral communication devices.

DETAILED DESCRIPTION OF INVENTION

Figure 1:
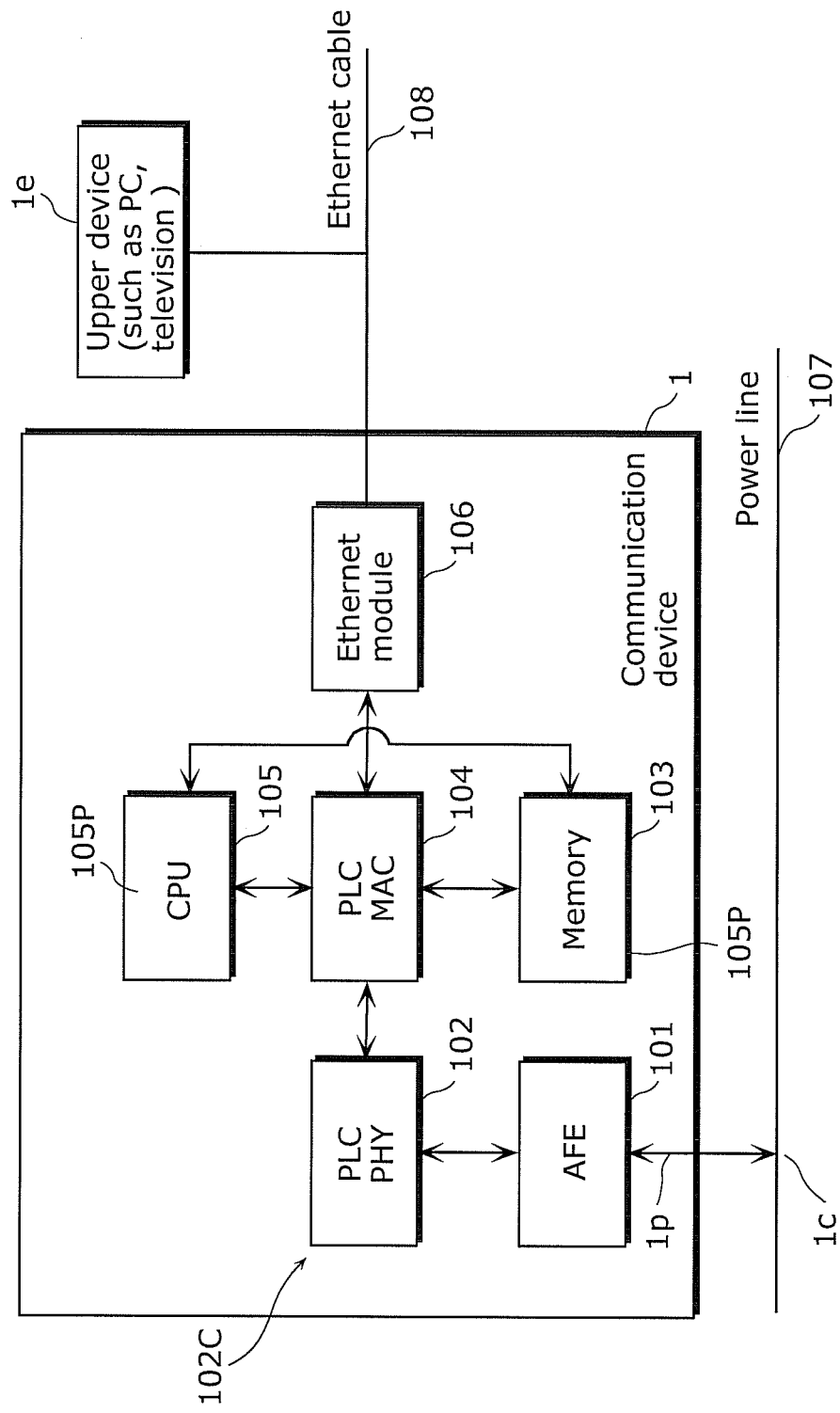
FIG. 1 is a block diagram showing the hardware configuration of a communication device in Embodiment 1 of the present invention.

Hereinafter, an embodiment of the present invention is described with reference to the accompanying drawings. In the drawing, in order to facilitate the understanding of the description, only the hardware and functional blocks according to the present invention are shown in a simplified form.

Figure 2:
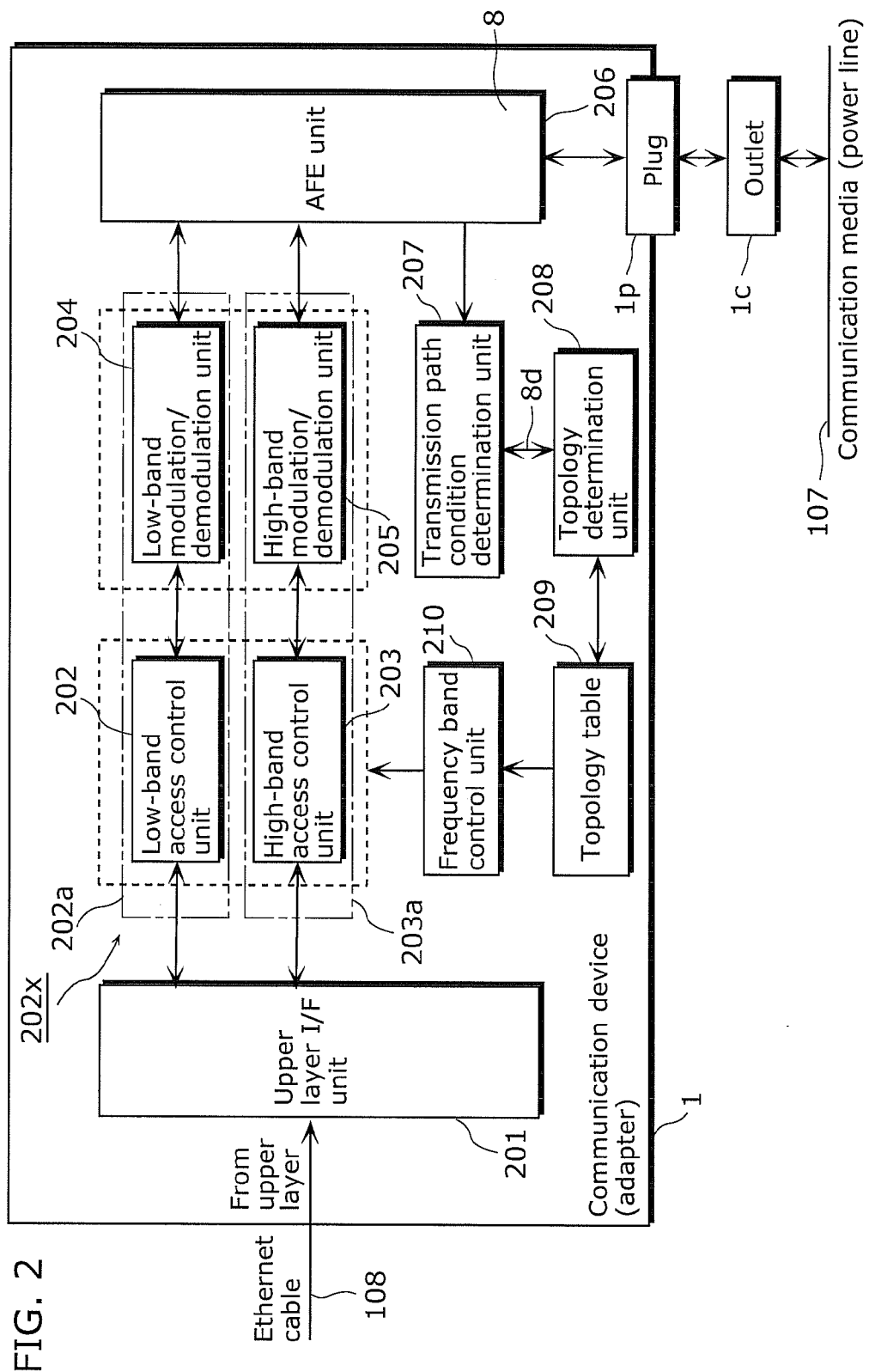
FIG. 2 is a block diagram showing the functional configuration of the communication device in Embodiment 1 of the present invention.
Figure 3:
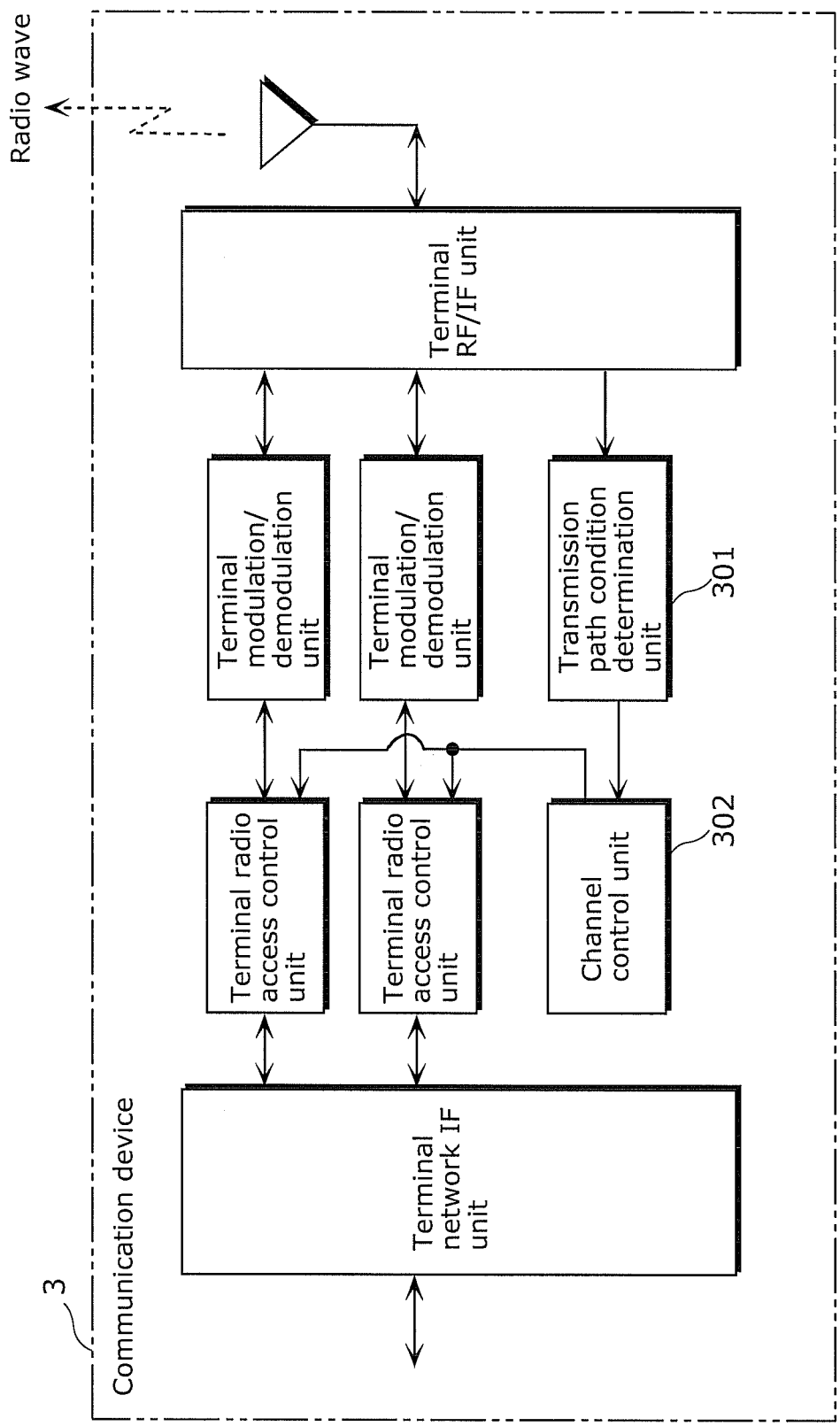
FIG. 3 is a block diagram showing the functional configuration of a conventional communication device.
Figure 16:
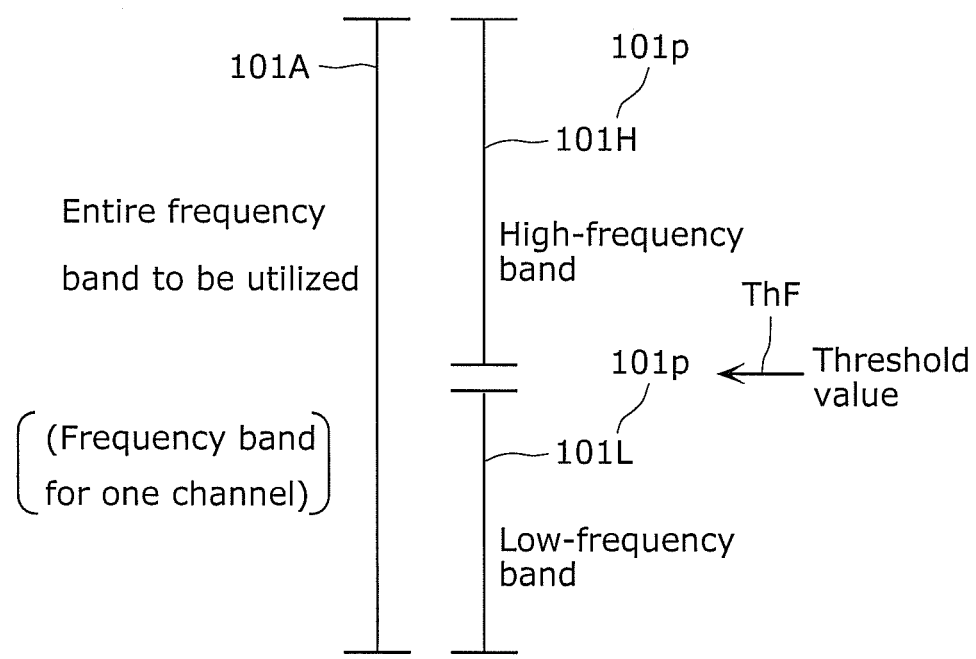
FIG. 16 is an illustration showing 3 bands.
Figure 17:
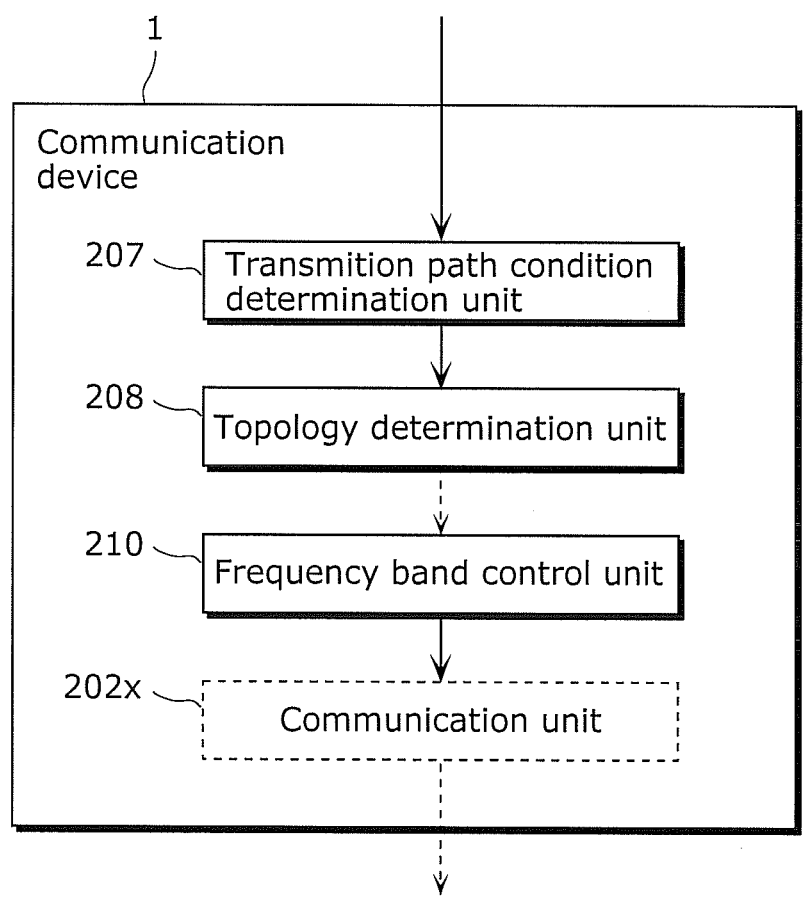
FIG. 17 is a diagram showing a communication device.

By the following description, a communication device (adapter) is disclosed, as a communication device according to the embodiment, the communication device 1 including: a transmission path state determination unit 207 for detecting a transmission path state (received power 8, data 8d (FIG. 2) showing the received power 8, and CINR in FIG. 2) in the communication with a destination device 1x (FIG. 4); a topology determination unit 208 for classifying the first destination device 1x1 into a first group 1G1, and a second destination device 1x2 into a second group 1G2, from a plurality of destination devices 1x (the first destination devices 1x1 and the second destination devices 1x2), the detected transmission path characteristics of the first destination device 1x1 satisfying a predetermined criteria (no significant difference 207h in FIG. 14), the detected transmission path characteristics of the second destination device 1x2 not satisfying the predetermined criteria; a frequency band control unit 210 for selecting a frequency band (for example, low-frequency band 101L) used for communication (power line communication 72) with the destination device 1x as a communication destination (for example, second destination device 1x2) between the first frequency band (low-frequency band 101L in FIG. 16) and the second frequency band (high-frequency band 101H) higher than the first frequency band, which have been divided from the frequency band capable of being used for communication (the entire frequency band 101A in FIG. 16 (see step S14 in FIG. 8, S42n in FIG. 18), based on whether destination device 1x as a communication destination is classified in the first group 1G1, or the second group 1G2; and a communication unit (communication unit 202x) for performing communication (a power line communication 72 (a power line communication 7a2)) with a destination device as a communication destination (second destination device 1x2) using the selected frequency band (low band 101L).

Accordingly, a power line communication 7b2 in the high-frequency band 101H is not performed, thereby preventing the communication quality reduction due to an occurrence of the significant difference 207h (FIG. 14), thus the quality of communication can be improved.

Furthermore, reduction of the quality due to the significant difference 207h can be prevented, that is not caused by a type of commonly used communication other than power line communication or communication via a coaxial cable, thus the quality of communication can be improved and a significant improvement can be achieved.

Thereby, both the improved quality of communication and the significant degree of the improvement can be achieved.

Furthermore, not only the first low-frequency band, but also the second high-frequency band is selected to be used, and the selected frequency bands are not congested in the first low-frequency band only, thus are also distributed to the second high-frequency band. For example, the second high-frequency band is also used and usable frequency bands are increased.

For example, the first group 1G1 includes the communication devices (communication device 1A1, 1A2, . . . ) which are connected to a breaker 401l, to which the communication device 1 having the topology determination unit 208 is connected. The second group 1G2 may include those communication devices (1B1, 1B2, . . . ) that are connected to another breaker 4012.

In other words, in the case where the criteria described above is satisfied, the criterion (condition) on which the classification into the group 1G1 is made is, for example, that the detected transmission path characteristic is the first transmission path characteristic between the communication device 1 and the first destination device 1x1 not through a breaker, and not the second transmission path characteristic between the communication device 1 and the second destination device 1x2 through a breaker, as described in detail later.

For example, the following communication system 4 is shown.

That is to say, for example, the communication system 4 includes a plurality of communication devices (e.g., the communication devices 1A1, 1A2, . . . 1B1, 1B2, . . . ). Each communication device has a plug 1p inserted into an outlet 1c out of a plurality of outlets 1c connected to the power line 107 for supplying power, provided in a house 4h.

And at least one communication device included in the plurality of communication devices (the communication device 1, for example, the communication device 1A1) has the topology determination unit 208 that determines whether power line communication 7 is the power line communication 71 (FIG. 4) performed not through the breaker 401b, or the power line communication 72 performed through the breaker 401b, the power line communication 7 being performed between the communication device 1 and the destination device 1x as one of other communication devices except the communication device 1, via the power line 107 connected to the outlet 1c to which the plug 1p of the communication device 1 is inserted.

And the communication device 1 performs the following operation in the case (see "S41: No") other than the case where power line communication is performed (see S14 in FIG. 8, S42n in FIG. 18) in the entire frequency band 101A (FIG. 16) including both the first frequency band (the low-frequency band 101L) lower than a threshold value ThF (FIG. 16), and the second frequency band (the high-frequency band 101H) higher than the threshold value ThF.

That is to say, as the power line communication 7H (FIG. 4) of the second high-frequency band in its operation, the communication device 1 includes the communication unit 202x that performs only the power line communication 7a11 with the first destination device 1x1, which is determined to be not through a breaker, and does not performs the power line communication 7b2 with the second destination device 1x2, which is determined to be through the breaker.

The communication unit 202x performs the power line communication 7a2 in the second low-frequency band with the second destination device 1x2, which is determined to be through the breaker.

The second destination device 1x2 then performs power line communication 1b2x (7a12) in the first high-frequency band with a communication device (for example, the communication device 1B1) which is connected to the same breaker as the breaker 4012 to which the second destination device 1x2 is connected while the communication unit 202x of the communication device 1 performs the power line communication 7a2 with the second destination device 1x2 in the second low-frequency band.

For example, in the present art, the transmission path characteristic of the power line communication 7a11 with the first destination device 1x1 in the high-frequency band 101H may be worse than the transmission path characteristic of the power line communication 7b11 in low-frequency band 101L.

Accordingly, it is difficult to get an idea of utilizing the power line communication 7a11 having such a relatively poor transmission characteristic based on the previous implementations, thus it is not easy to think of the present technique from the previous implementations.

Specifically, for example, when the bit rate of the data transmitted between the communication device 1 and other communication device (destination device 1x) as the communication destination is higher than a threshold value (see "S41: No" in FIG. 18), the control unit (the frequency band control unit 210) may control the communication (S42n) using the both first and second frequency bands (the entire frequency band 101A) regardless of whether other communication device as the communication destination is classified in the first group or the second group (see "S42: high-frequency band", "S42: low-frequency band").

Only when the bit rate is less than or equal to the threshold value (S41: Yes), the power line communication 7 (the power line communication 7a11, 7a2) may be performed in a partial frequency band 101p of the entire frequency band 101A, which is the frequency band (the high-frequency band 101H in the case where the destination device 1x is the first destination device 1x1 (S42: high-frequency band), or the low-frequency band 101L in the case where the destination device 1x is the second destination device 1x2 (S42: low-frequency band)) corresponding to (the group into which the destination device 1x is classified).

The communication in the entire frequency band 101A is performed, for example, only in a special case (extremely rare case) such as the case where special arrangement is made by an expert engineer of the manufacturer of the communication device 1, and may not be performed in normal times.

Figure 18:
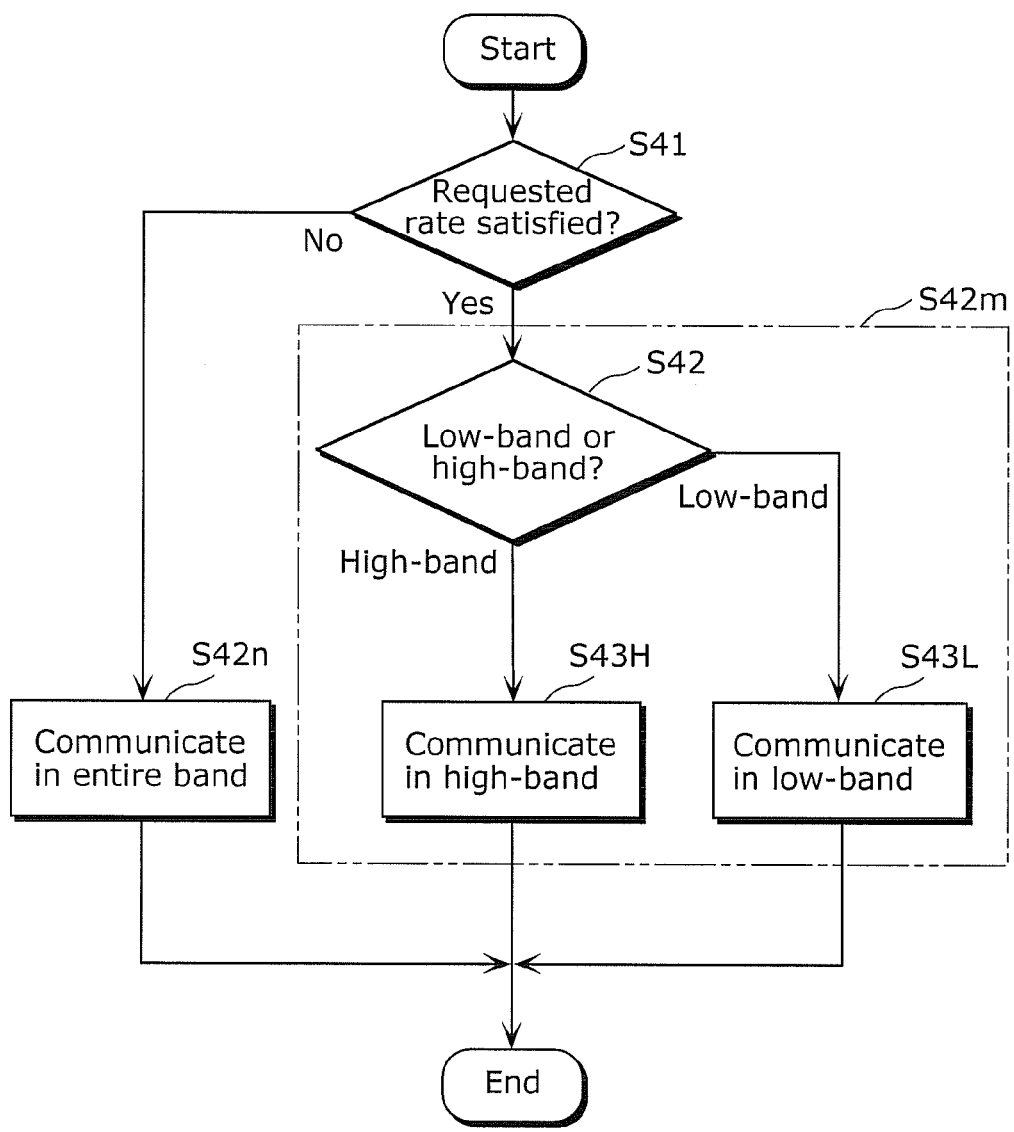
FIG. 18 is a flowchart for processing communication device.

In other words, divided frequency band means, for example, communication is performed in such a partial frequency band 101p (the low-frequency band 101L, the high-frequency band 101H) within the entire frequency band 101A (see e.g., S42m in FIG. 18).

Embodiment 1

FIG. 1 is a block diagram showing the hardware configuration of a communication device (see communication device 1 of FIG. 2 and FIG. 4) according to Embodiment 1 of the present invention.

In FIG. 1, the communication device 1 includes an Analog Front End (AFE) 101, a Power Line Communication Physical Layer (PLC PHY) 102, a memory 103, a Power Line Communication Media Access Control (PLC MAC) layer 104, a Central Processing Unit (CPU) 105, and an Ethernet™ module 106.

The analog front end 101 is connected to the power line 107.

The Ethernet™ module 106 is connected to an Ethernet™ cable 108.

The analog front end 101 performs A/D conversion, D/A conversion, AGC (Automatic Gain Control), and coupling in the communication (power line communication) via the connected power line 107.

The power line communication physical layer 102 performs sampling, modulation, demodulation, and error correction processing.

The memory 103 stores the programs (see a program 105P) for executing the procedure of the present invention, transmission data, and receiving data.

The power line communication MAC layer 104 performs framing, Cyclic Redundancy Checking (CRC) code addition, CRC check, transmission control, receiving process, communication state monitoring, and resending control.

The CPU 105 performs upper layer I/F control and also serves as a communication control unit.

The Ethernet™ module 106 transmits and receives data to Ethernet™ via the Ethernet cable 108.

The communication device 1 in the present embodiment performs OFDM (Orthogonal Frequency Division Multiplexing) communication using a frequency band in a range from 2 MHz to 80 MHz.

The OFDM communication performed by the communication device 1 includes 3 types: OFDM communication using the entire frequency band of a range from 2 MHz to 80 MHz (broadband communication); OFDM communication using the frequency band of a range from 2 MHz to 30 MHz (low band communication); and OFDM communication using the frequency band of a range from 30 MHz to 80 MHz (high band communication).

The communication device 1 selects one of these 3 types of communication, and performs the selected communication.

Specific function of each type of the broadband communication, the high-band communication, and the low-band communication is basically implemented by the same hardware, and the switching control (control of switching the communication to be used between 3 types of communication) is performed by the CPU 105.

In the present embodiment, the communication device 1 performs OFDM communication, however, the modulation/demodulation method is not limited to OFDM and the broadband communication, the high-band communication, and the low-band communication by other modulation/demodulation method may be performed.

FIG. 2 is a block diagram showing the functional configuration of the communication device according to Embodiment 1 of the present invention.

In FIG. 2, the communication device 1 includes an upper layer I/F unit 201 and a low-band access control unit 202, a high-band access control unit 203, low-band modulation/demodulation unit 204, high-band modulation/demodulation unit 205, an AFE (Analog Front End) unit 206, a transmission path state determination unit 207, a topology determination unit 208, a topology table 209, and a frequency band control unit 210.

In the communication device 1 of the present embodiment, the AFE unit 206 works for the integrated band of the low-frequency band and the high-frequency band, however, individual AFE unit 206 dedicated to each band may be provided. In other words, for example, a processing unit including 2 or more AFE units 206 may be provided.

For example, in communication device 1, the low-band access control unit 202 and the high-band access control unit 203 are achieved by the power line communication MAC layer 104 (FIG. 1).

The low-band modulation/demodulation unit 204 and the high-band modulation/demodulation unit 205 are achieved by the power line communication physical layer 102.

Also, the AFE unit 206 is achieved by the analog front end 101.

The topology table 209 is stored in the memory 103.

The upper layer I/F unit 201, the transmission path state determination unit 207, the topology determination unit 208, and frequency band control unit 210 are achieved by the CPU 105 or the power line communication MAC layer 104.

Figure 4:
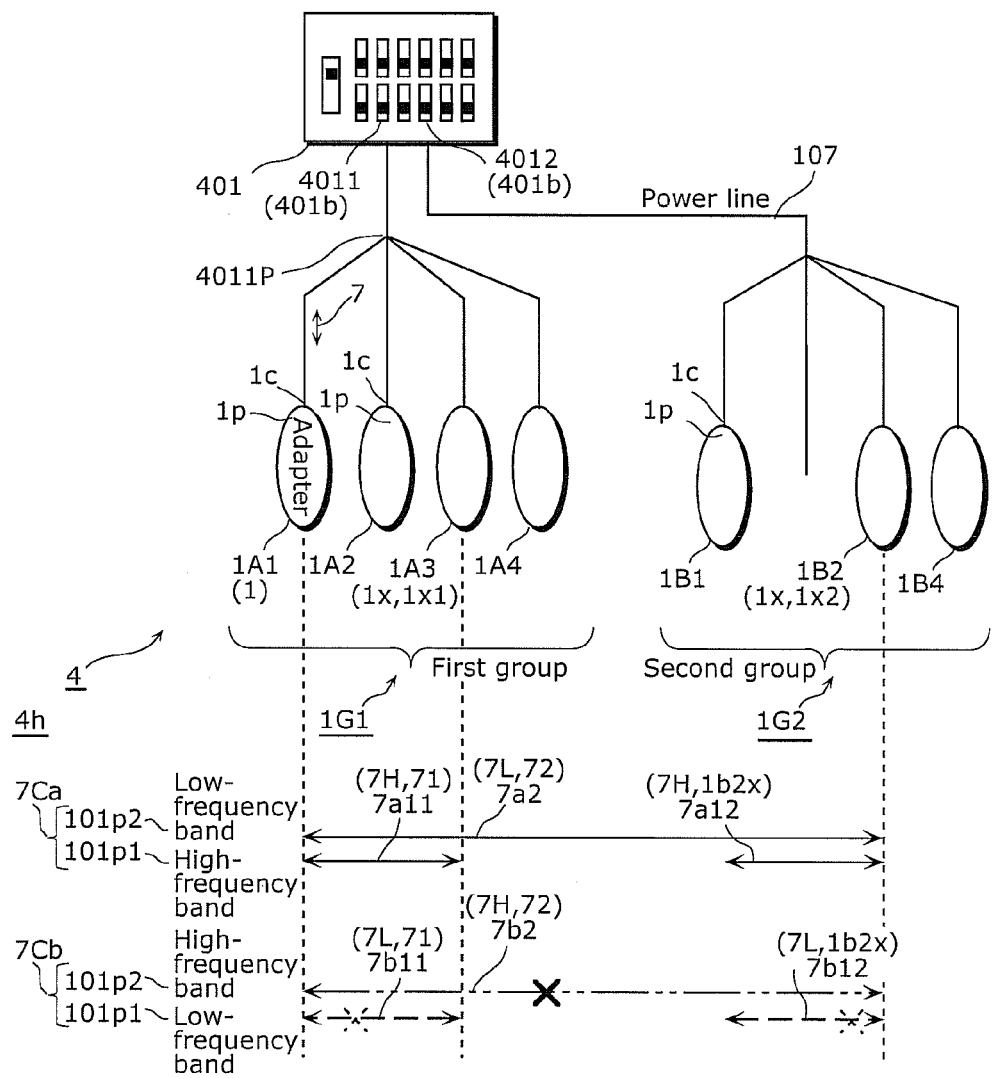
FIG. 4 is an illustration showing an exemplary schematic configuration of a power line communication system.

FIG. 4 is an illustration showing an exemplary schematic configuration of a power line communication system (communication system 4) constituted by the communication device 1.

In the power line communication system of FIG. 4, 7 communication devices (communication device 1A1, 1A2, . . . , 1B1, 1B2, . . . ) are connected to the power line.

Here, the communication devices 1A1, 1A2, 1A3, and 1A4 are connected to the same stream from a breaker A (breaker 4011). That is to say, all of these communication devices including 1A1 are connected to the same breaker (breaker 4011).

On the other hand, the communication device 1B1, 1B2, 1B4 are connected to the same stream from a breaker B (breaker 4012).

The first group 1G1 includes a plurality of communication devices (communication devices 1A1, 1A2, . . . ) (directly) connected to the same breaker as the breaker 4011 to which the communication device 1A1 is connected.

On the other hand, the second group 1G2 includes a plurality of communication devices (communication devices 1B1, . . . ) connected to the breaker 4012 different from the breaker 4011.

The breaker A and breaker B works independently from each other, thus communication between the breaker A and the breaker B needs to be performed via a distribution board 401.

Generally, in the power line communication, the higher the frequency band, the greater the attenuation of transmission signal (see the description in FIG. 14 below).

In the case where the power line communication is performed via a distribution board, the influence of the impedance of the distribution board itself (such as the impedance of the breaker 401b of the distribution board 401) is also added. For this reason, the transmission signal via the distribution board 401 tends to have an even greater attenuation in the high-frequency band.

Accordingly, in the case where the frequency band is classified in 2 bands: the low-band (2 MHz to 30 MHz) and the high-band (30 MHz to 80 MHz) (see FIG. 16), compared with the transmission signal not via the distribution board 401, the transmission signal via the distribution board 401 has a significant difference between the average signal attenuation in the low-frequency band and the average signal attenuation in the high-frequency band.

Hereinafter, transmission path estimation in the communication device 1 of the present embodiment, and an example of creation procedure of the topology table 209 are shown.

The transmission path state determination unit 207 determines the state of a transmission path in each of the high-frequency band and the low-frequency band (hereinafter referred to as a transmission path estimation).

For determining the state of a transmission path, for example, known random data is transmitted and received between the communication device 1 and another communication device, then the state is determined based on the result (the result of communication of the transmission and reception).

The transmission path state determination unit 207 estimates a transmission path before starting communication.

The transmission path estimate is made between communication devices (2 communication devices) which communicate with each other, in both the low-frequency band and the high-frequency band.

The information about communication system determined by the transmission path estimate includes the modulation method of each carrier, FEC (Forward Error Correction) code used, and the frequency band used.

In addition, for example, the information about the symbol length, the number of carriers used for the communication, and the type of multi-carrier conversion (such as FFT system, Wavelet system) may be transferred in the transmission path estimate.

Figure 5:
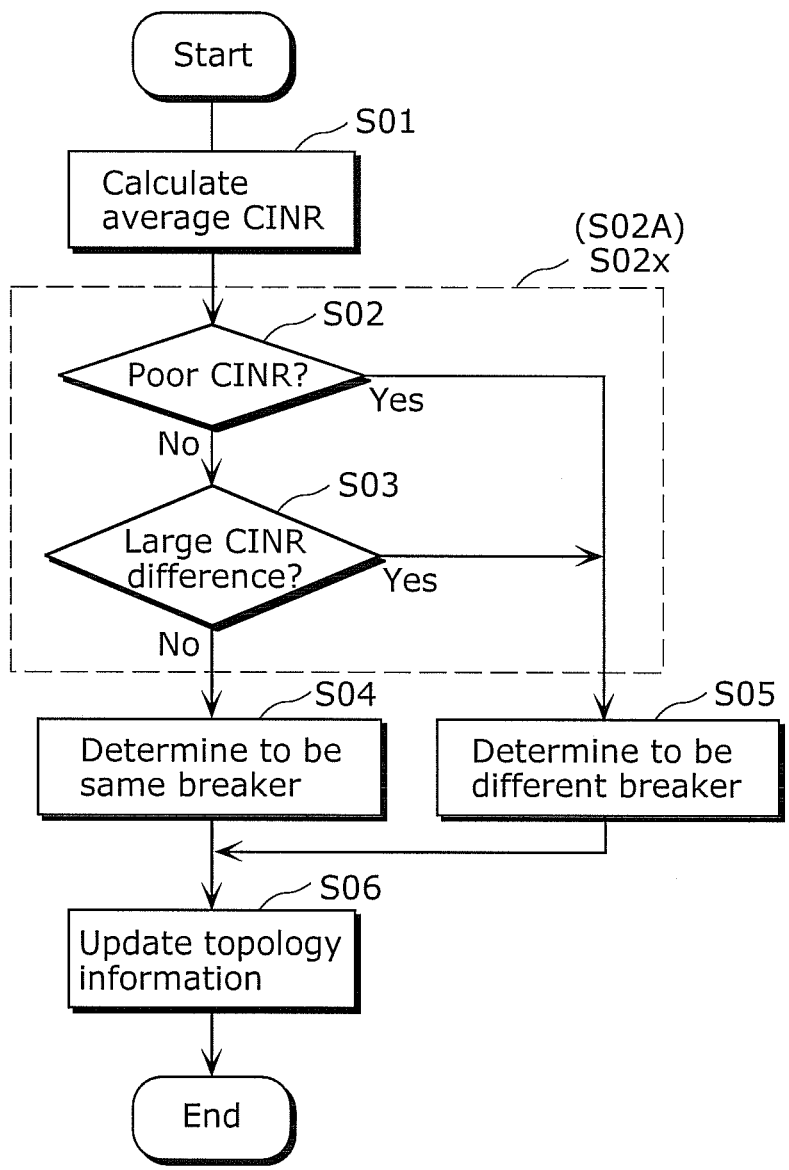
FIG. 5 is a flowchart showing the procedure for creating a topology table 209.

FIG. 5 is a flowchart showing the procedure for creating the topology table 209 based the transmission path determination.

FIG. 6 is a table showing an exemplary topology table 209.

Specifically, for example, the topology table 209 may be a topology table 209a as shown in FIG. 6. Furthermore, for example, a table storage part 209H which stores the data of the topology table 209 may be provided in the communication device 1.

First, the transmission path state determination unit 207 calculates, as a determination index of the state of the transmission path, CINR (Carrier to Interference and Noise Ratio) of each carrier included in both the low-frequency band and the high-frequency band.

The topology determination unit 208 creates the topology table 209 based on the determined result from the transmission path state determination unit 207, the topology table 209 showing a topological relationship with the communication device of the destination (destination communication device, destination device).

The topology determination unit 208 starts its topological relationship determination by calculating respective average CINRs in the low-frequency band and the high-frequency band, using the CINR obtained from the transmission path state determination unit 207. (Step S01).

In the subsequent step S02, in the case where the calculated average CINR in the low-frequency band is less than or equal to a predetermined threshold value Tcl (step S02: Yes), it is determined that the destination communication device is connected to a breaker for another independent wiring (see step S05 and the second destination device 1x2 (FIG. 4)).

On the other hand, in the case where the calculated average CINR in the low-frequency band is greater than the predetermined threshold value Tcl (step S02: No), the process proceeds to step S03.

In step S03, the average CINR on the low-band, and the average CINR in the high band are compared, and in the case where the difference therebetween is greater than or equal to a predetermined threshold value Tc (step S03: Yes), it is determined that the destination communication device is connected to a breaker for another independent wiring (step S05).

On the other hand, in the case where the calculated average CINR in the low-frequency band is less than the predetermined threshold value Tc (step S03: No), it is determined that the destination communication device is connected to a breaker for the same wiring (see step S04 and the first destination device 1x1 (FIG. 4)).

Based on the above determination result, the topology table 209 about the information of the destination communication device is created or updated (step S06), and the creation process of the topology is terminated.

Methods of determining topology other than the method using average CINRs described above include, for example, the following method.

For example, RSSI (Received Signal Strength Indication (Indicator)) indicating the received power of the signal transmitted from the destination communication device, and an attenuation in the transmission path calculated from known transmission power may be used instead of CINR.

In the case where transmission power is not fixed but is variably controlled, the attenuation in the transmission path can be determined by including the information about transmission power in the header of a transmission packet for notifying the information.

That is to say, in the case where the topology is determined using the attenuation in the transmission path, and the average attenuation in the low-frequency band is less than or equal to a predetermined threshold value Trl, the destination communication device is determined to be connected to a breaker for another independent wiring.

And in the case other than the case mentioned above, the average attenuation in the low-frequency band and the average attenuation in the low-frequency band are compared. When the difference between the two average attenuations is greater than or equal to a predetermined threshold value Tr, the destination communication device is determined to be connected to a breaker for another independent wiring. On the other hand, when the difference between the two average attenuations is less than the predetermined threshold value Tr, the destination communication device is determined to be connected to the breaker.

The method of determining a topology is not limited to these methods, and, for example, other available parameters such as a packet error rate of each frequency band, or a bit error rate may be used for determining a topology.

The topology table 209 may be created every time before starting communication with the destination communication device, or may be updated by sending a test packet periodically to the destination communication device. In this manner, even when the topology for the destination communication device is changed, the change can be handled, and a proper operation can be carried out.

Alternatively, the topology table 209 may be created without using a test packet by observing normal packets transmitted by the destination communication device and using the result of a measurement by the observation. Thereby, temporary increase of communication traffic due to the transmission of the test packet for topology table creation can be suppressed.

In the case where a newly added communication device transmits and receives test packets for creating a topology table for all other peripheral communication devices, a high volume of traffic may occur every time a newly added communication device is connected.

Thus, in order to avoid this problem, a technique can be devised, in which the newly added communication device broadcasts topology table request packets to the peripheral communication devices before creating the topology table 209.

In this case, each communication device which has received the topology table request packet determines the transmission path state based on the received packet, and each destination communication device which has determined that the newly added communication device is connected to the same breaker, transmits the topology table 209 created by itself to the newly added communication device.

The newly added communication device stores, as its own topology table 209, the received topology table 209 which has been created by other communication device.

In the case where the topology tables 209 are received from a plurality of other communication devices, the number of the topology tables which have determined that the communication device is connected to the same breaker, and the number of the topology tables which have determined that the communication device is connected to another breaker may be counted, then the larger count may be used as the result of determination by the communication device. In short, each topology table 209 is created, for example, by a method of decision by majority.

When the frequency band control unit 210 refers to the topology table 209 and determines that the destination communication device to be communicated with exists in a group belonging to the same breaker (i.e., included in the first group 1G1 belonging to the same breaker as the breaker 4011 to which the present communication device 1 is connected) (see S04 in FIG. 5, "S41: Yes" in FIG. 15), the frequency band control unit 210 commands the high-band access control unit 203 to perform the (previously described) high-band communication by priority (see S42H, S43H).

On the other hand, when the frequency band control unit 210 determines that the destination communication device exists in a group belonging to another breaker (see S05, "S41: No" in FIG. 5), the frequency band control unit 210 commands the low-band access control unit 202 to perform the (previously described) low-band communication (see S42L, S43L).

Figure 8:
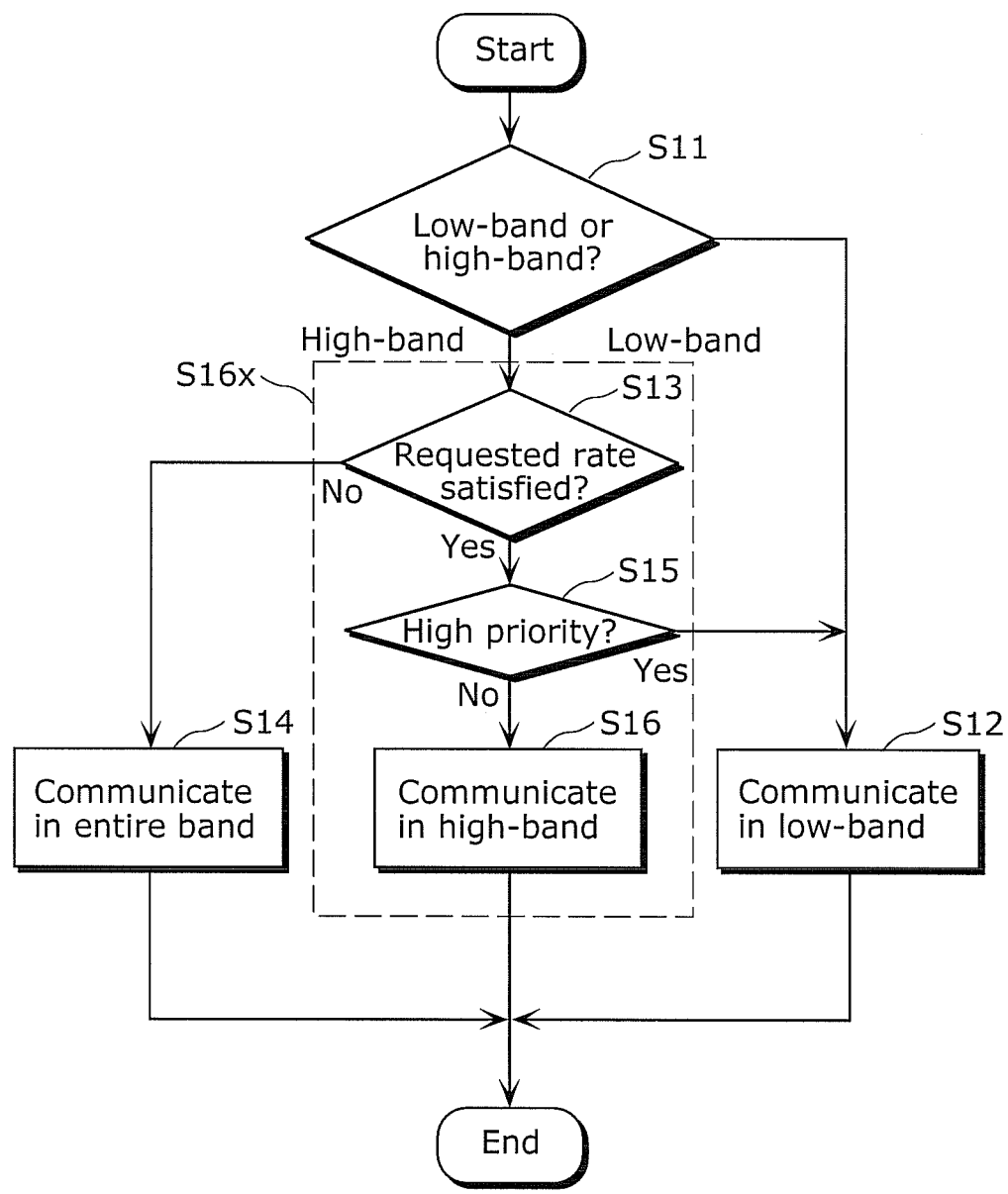
FIG. 8 is a flowchart showing the procedure for frequency band control based on the content of a communication packet.

Even when it is determined that the destination communication device exists in a group belonging to the same breaker (see S04), in the case where the low-band communication performed by other communication device cannot be detected, the broadband communication using both the low-band and high-band (see (previously described) broadband communication, and the description in FIG. 8) may be performed.

The access control unit (the low-band access control unit 202, the high-band access control unit 203) which has received a command to communicate performs medium access control so that a transmission packet from the communication device may not collide with any transmission packet of other communication devices.

Examples of medium access control includes, for instance, TDMA (Time Division Multiple Access) which synchronizes all the devices which involve in the communication, and each device performs communication in turn, and CSMA/CA (Carrier Sense Multiple Access/Collision Avoidance) which performs communication after confirming that no communication device is on operation by carrier sense.

Although the low-band and high-band may be operated independently of each other, it is desirable to perform synchronized communication in the following manner.

The communication device 1 extracts synchronization timing by receiving a signal used in another communication performed in a frequency band not used for the current communication, and uses the extracted synchronization timing as synchronization timing in the current communication in the band actually used. In this manner, such communication is made possible that is synchronized at least in units of symbol in both frequency bands.

In the synchronization timing measurement described here, for example, a symbol synchronization circuit of PLC PHY used in normal communication may also be used for the measurement. Synchronized communication in both frequency bands is made possible by recognizing synchronization timing directly using e.g., a synchronization circuit, however, similar effect can be obtained by inserting a time stamp for synchronization timing in each packet header so that the value of the time stamp is received.

Furthermore, a flag for synchronization control is added to the header, and synchronization is achieved by using only those packets whose flags are ON. By controlling the synchronization in this manner, synchronization can be achieved using only those packets suitable to synchronizing signal. Thereby, even more precise synchronization can be established.

So far, the case has been described where communication is synchronized in both the low-band and high-band regardless of coming packets, however, it is desirable to use a synchronizing signal to synchronize communication at an initial state of the communication, or in a state where no packets are transferred. As a synchronizing signal, for example, a beacon, a token, and a polling are available that are used when a centralized control network is constructed.

In other words, the communication device serving as a parent device first checks whether a synchronizing signal is being transmitted in a power line communication network. In the case where a synchronizing signal is transmitted in a single-sided band (the low-band or the high-band), and the other single-sided band is desired to be used to establish a network, the communication device also transmits a synchronizing signal in synchronization with the previously transmitted synchronizing signal.

Also, a synchronous flag (flag for synchronization) may be added to the above-described synchronizing signal, which in turn may be used with ON state. Alternatively, without using the synchronizing signal, the above-mentioned flag for synchronization may be added to each normal packet, which may be used as a synchronizing signal. By combining the synchronization and data transmission, the transmission efficiency can be improved.

Figure 14:
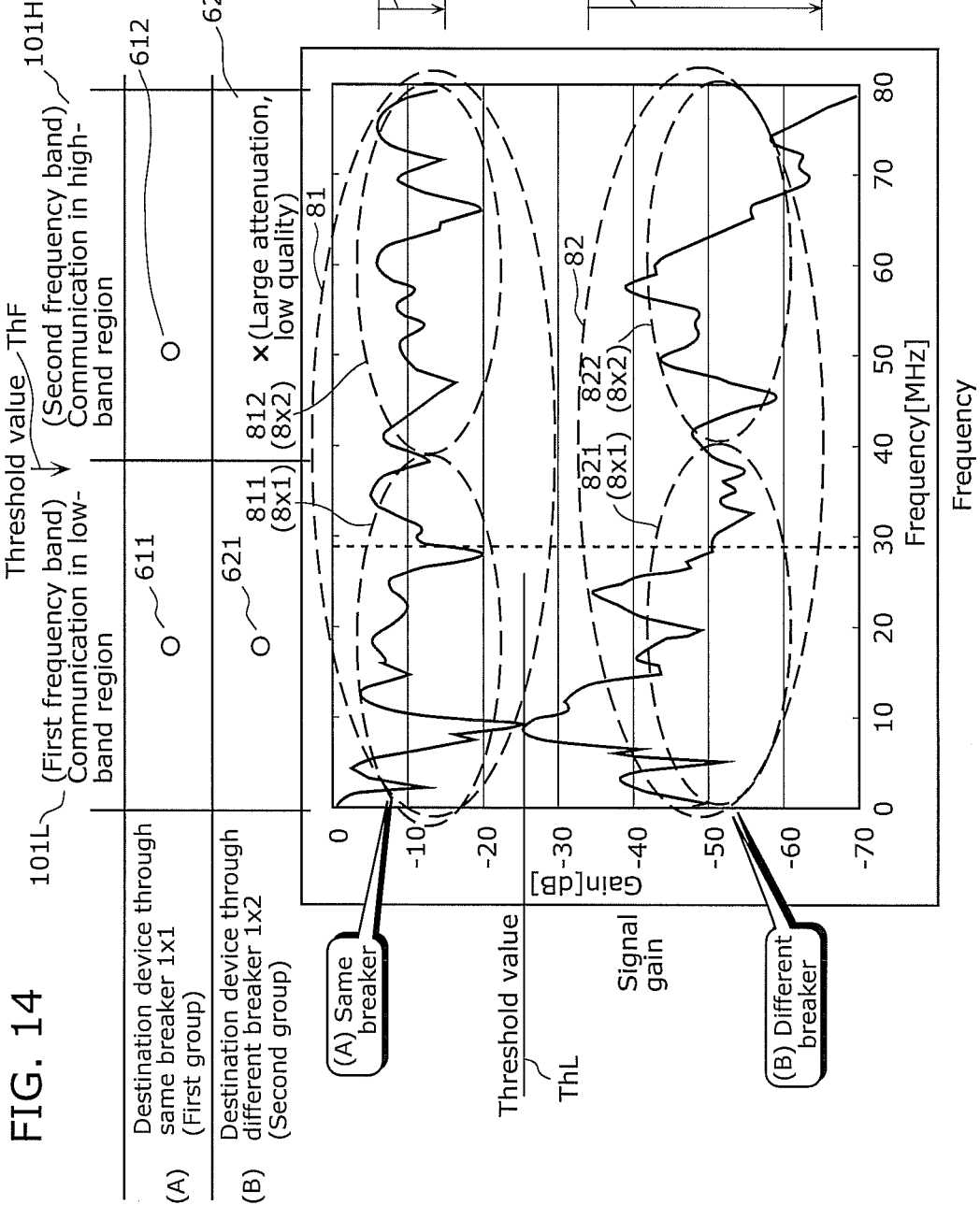
FIG. 14 is a chart showing a graph of received power.

With such a configuration, the frequency band control unit 210 controls the band according to the transmission path characteristic associated with the destination communication device, thus useless try to use a frequency band, which is difficult to be used by the communication device 1 for communication, may be avoided (see the significant difference 207h2 which reduces the quality of communication in the frequency band 101H higher than the threshold value ThF, in the received power 82 under another breaker 4012 in FIG. 14, which is described in detail later). The communication efficiency of the entire transmission path in the power line communication can be improved.

In the present embodiment, the topology determination unit 208 for determining between the same breaker and another breaker is provided, however, a transmission path group determination unit for determining the difference in transmission path characteristics may be provided instead.

That is to say, the communication devices are divided into 2 groups: a group for performing high-band communication by priority, and other group for performing low-band communication by priority. In this case, the communication device 1 has a transmission path group table instead of the topology table 209, and controls frequency band. The number of the above-mentioned transmission path groups is not limited to 2, and the communication devices may be classified in 3 or more groups for frequency band control.

In the present embodiment, the communication device serves as an adapter which converts the signal interface of Ethernet™ to the interface of power line communication, however, without being limited to this configuration, a communication device having a similar communication function may be embedded into a multimedia device such as a personal computer, a DVD (Digital Versatile Disc) recorder, a digital television, and a home server system.

Embodiment 2

Hereinafter, Embodiment 2 of the present invention is described in detail using a specific example. In Embodiment 2, an example of a frequency band setup according to the content of communication traffic.

Figure 7:
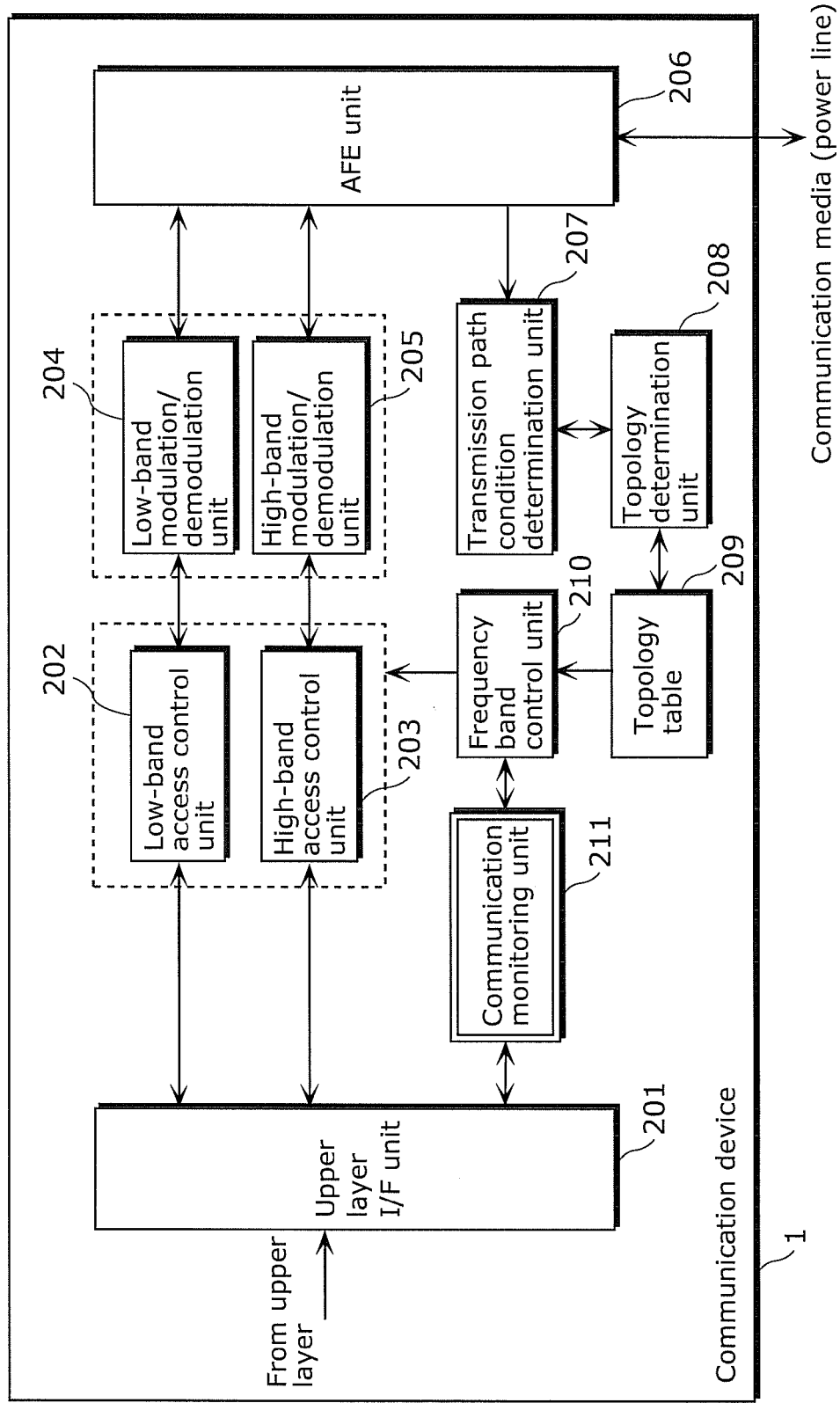
FIG. 7 is a block diagram showing the functional configuration of a communication device in Embodiment 2 of the present invention.

FIG. 7 is a block diagram showing the functional configuration of a communication device 1 in Embodiment 2 of the present invention.

In FIG. 7, the same components as in FIG. 1 are denoted by the same reference symbols, and their detailed description is omitted as appropriate.

In FIG. 7, Embodiment 2 differs from Embodiment 1 in that a communication monitoring unit 211 for monitoring the content of the traffic in the communication device 1 is newly added.

For example, the communication monitoring unit 211 is achieved by the CPU 105 or the power line communication MAC layer 104.

The communication monitoring unit 211 acquires the information about the traffic (traffic information) from the upper layer I/F unit 201, and notifies the information to the frequency band control unit 210.

The frequency band control unit 210 controls the frequency band for use based on the notified traffic information.

Hereinafter, a specific procedure for frequency band control is described.

FIG. 8 is a flowchart showing the procedure for frequency band control based on the content of a communication packet.

The frequency band control unit 210 starts its frequency band control by determining whether the low-band or the high-band is used by priority based on the topology table 209 as described above (step S11).

When the low-band communication is a higher priority (S11: low-band), communication is performed using the low-band (step S12).

Thereby, decrease of the overall communication efficiency is reduced by avoiding inefficient communication in the high-band.

On the other hand, when the high-band communication is a higher priority (S11: high-band), the process proceeds to step S13, and the frequency band control unit 210 acquires request rate information indicating a rate required by a traffic (transmission rate, requested transmission rate), and based on the topology table 209, determines whether or not the requested transmission rate indicated by the acquired requested rate information is satisfied using only the single-sided band to be used.

For example, in the determination, an estimated throughput is calculated based on information such as the modulation system of each carrier, the coding rate of FEC (Forward Error Correction) code used, the packet error rate and the bit error rate in past communication, and the above-described determination is made where the information is determined from the transmission path estimate by the transmission path state determination unit 207.

When it is determined that the estimated throughput does not satisfy the requested transmission rate in step S13 (S13: No), broadband communication is performed using both the high-band and the low-band (step S14).

On the other hand, when it is determined that the estimated throughput satisfies the requested transmission rate (S13: Yes), the process proceeds to step S15, and it is determined whether or not the priority of the traffic is high.

Here, examples of a traffic having a high priority include a traffic of voice packets (for example, VOIP (Voice Over Internet Protocol) packet), video packet (for example, MPEG (Moving Picture Experts Group) packet) that are required to satisfy the condition of QoS (Quality of Service) such as an upper limit of delay time, and prevention of jitter.

When the priority of the traffic is determined to be high in S15 (S15: Yes), the frequency band control unit 210 controls the system so that communication using the low-band is performed by priority (step S12). In the case where it is detected that communication is being performed in the low-band by another communication device, packets may be transmitted first by the high-band communication.

On the other hand, when the priority of the traffic is determined to be low (S15: No), the frequency band control unit 210 controls the system so that communication using the high-band is performed by priority (step S16).

When the determination of "S11: low-band" is made, for example, the low-band communication may be performed (S12).

In an exceptional case of (S13: No, S15: Yes) after the determination of "S11: low-band" is made, the subsequent operation may be performed, otherwise in a non-exceptional case, the high-band communication (S16) may be performed (S16x).

In other words, even when the determination of "S11: low-band" is made, if the determination of "S13: No" is made, the above-described high-band communication (S14) may be performed.

Also, even when the determination of "S11: low-band" is made, if the determination of "S15: Yes" is made, the low-band communication (S12) may be performed.

By the procedure as shown above, the frequency band is controlled according to the content of a communication.

With such a configuration, the frequency band control unit 210 controls frequency band according to both the characteristics of the transmission path and the content of the communication packets transmitted between the communication device 1 and the destination communication device, thus the communication packets required to have QoS can be efficiently transmitted without (significantly) reducing the communication efficiency of the entire communication path.

Embodiment 3

Hereinafter, Embodiment 3 of the present invention is described in detail using specific examples.

In Embodiment 3, an example for increasing the precision of the determination of topology made by the topology determination unit 208 is described.

Figure 9:
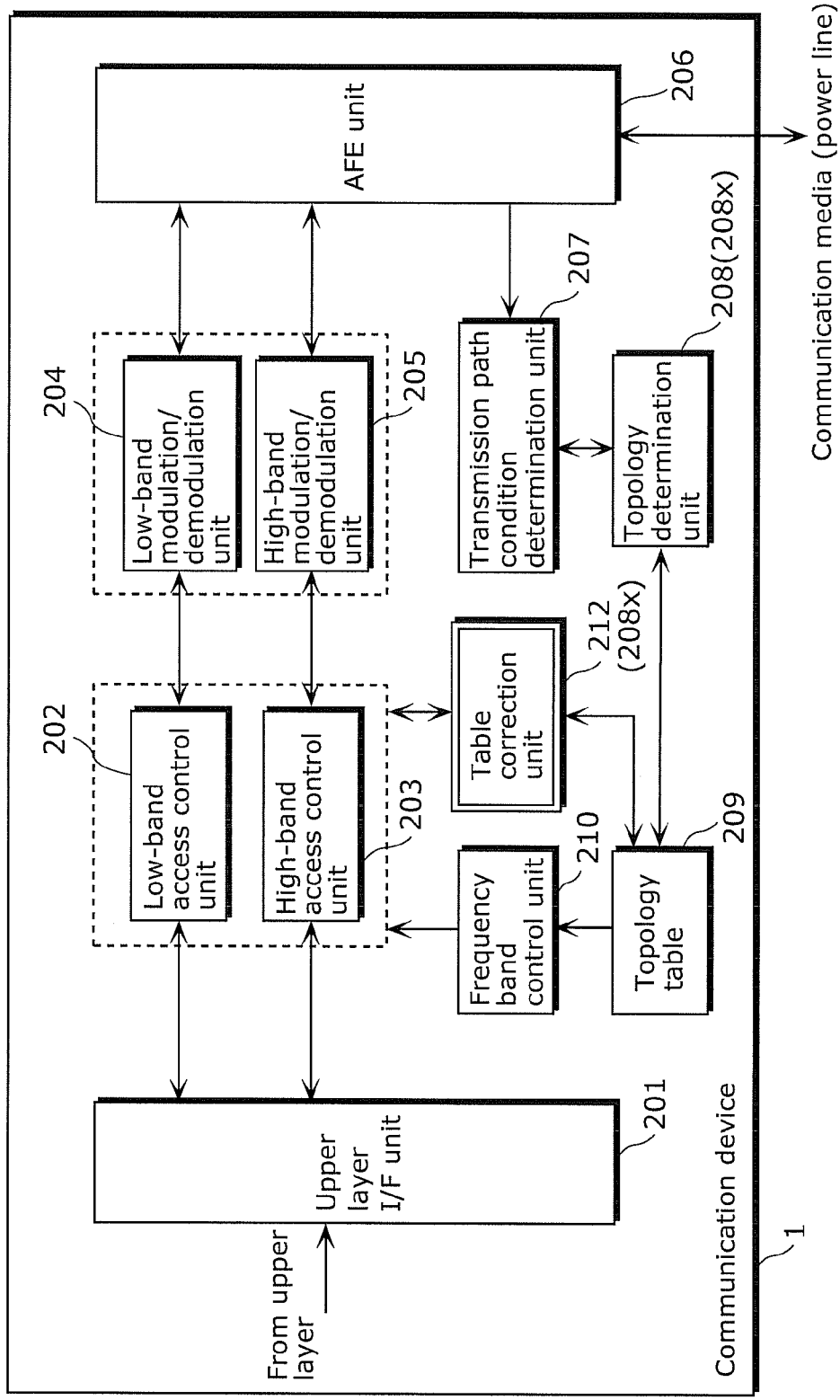
FIG. 9 is a block diagram showing the functional configuration of a communication device in Embodiment 3 of the present invention.

FIG. 9 is a block diagram showing the functional configuration of the communication device 1 according to Embodiment 3 of the present invention.

In FIG. 9, the same components as in FIG. 1 are denoted by the same reference symbols, and their detailed description is omitted as appropriate.

Embodiment 3 differs from Embodiment 1 in that a table correction unit 212 is newly added to the communication device 1 which exchanges topology information with the peripheral communication devices and the content of the topology information is corrected by the table correction unit 212.

The table correction unit 212 is achieved by the CPU 105, or the power line communication MAC layer 104.

In the above-described determination of the topology, there is a possibility that an incorrect determination is made as to whether the communication device 1 is connected to the same breaker or another breaker. That is to say, not only the case of a correct determination, but also the case of an incorrect determination is possible.

Examples of such case, i.e., the case of an incorrect determination include the case where determination is made based on the average CINR under the large influence of the noise in the high-band. In this case, the CINR is deteriorated even for the communication between the communication devices belonging to the same breaker.

Also, in the case where determination is made based on the receiving power under the large influence of the noise in the high-band, it may be determined that the receiving power is high even for the communication between the communication devices belonging to different breakers.

Hereinafter, a description is given by assuming a power line communication system having the configuration as shown in FIG. 4.

FIG. 10 is a table showing an exemplary topology table of peripheral communication devices, which is acquired by an topology information exchange.

Figure 11:
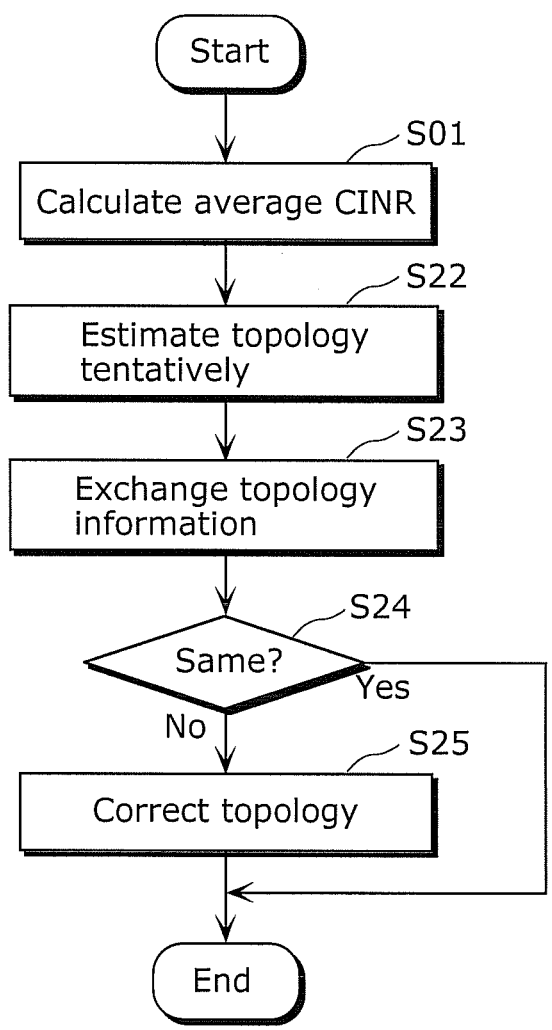
FIG. 11 is a flowchart showing the procedure for topology table correction.

Also, FIG. 11 is a flowchart showing the procedure for topology table correction.

Hereinafter, a specific procedure for correcting the topology table 209 of a communication device A1 (for example, the communication device 1A1 in FIG. 4 (communication device 1)) is described using FIG. 11.

Each communication device calculates the average CINR of each frequency band by the above-described step S01 in order to create a topology table of its own. Then based on the calculation result, a tentative estimate of the topology is made by the process in step S02 to step S06 (FIG. 5) (step S22).

In the subsequent step S23, the communication device A1 refers to the topology table 209 held thereby, and commands each of the communication device A2, A3, A4, B1 presumed to be in the same breaker (see the 3rd to 6th rows of the 1st column of the table of FIG. 10, for example, the communication devices 1A2, 1A3, 1A4, 1B1 in FIG. 4) to send the topology table 209 back to the communication device A1 (step S23).

Each communication device which has received the command refers to its own topology table 209, and transmits it to the communication device A1 when each communication device is determined to be connected to the same breaker as that of the communication device A1.

Here, when the communication device B1 determines that it is connected to a different breaker than that of the communication device A1, the communication device B1 does not transmit its topology table 209 to the communication device A1.

In this manner, each communication device makes correction based on the information from another communication device (communication devices A2, A3, A4) which is recognized to be belonging to the same breaker, thus a possibility of making a false correction is reduced.

The information obtained from topology information exchange in the above manner forms the topology table (topology table 209b (209)) of the peripheral communication devices, shown in FIG. 10.

Next, the communication device A1 compares its topology table 209 with that of another communication device (step S24), and when two topology tables are different (step S24: No), makes a correction (step S25), otherwise, makes no correction (step S24: Yes).

FIG. 10 shows that the communication device A1 determines that the destination device B1 is connected to the same breaker as that of the communication device A1, and yet each of other communication devices A2, A3, A4 determines that the destination device B1 is connected to a different breaker. In other words, only one device (the communication device A1) determines that the destination device B1 is connected to the same breaker, while 3 devices (the communication devices A2 to A4) determine that the destination device B1 is connected to a different breaker, thus it is more likely that the destination device B1 is connected to a different breaker. Based on this, the communication device A1 corrects the result of the determination regarding the communication device B1, the corrected result of the determination indicating that the destination device B1 is connected to a different breaker.

With such a configuration, possibility of erroneous band control is reduced due to an improvement in the precision of topology information, thus the communication efficiency of the entire transmission path in the power line communication can be further improved.

In the present embodiment, each communication device requests peripheral communication devices to transmit their topology tables 209, however, each communication device may periodically transmit its own topology table 209 to the peripheral communication devices, each of which may make an independent determination similar to the above-described determination to correct the topology table 209.

In the present embodiment, determination regarding the correction of the topology table 209 is made by comparing it with the topology tables 209 of other communication devices and making a decision by majority, however, the determination may be made based on weighted likelihood (probability) of correctness of the topology information of each of the other communication devices.

More specifically, as a technique of weighted probability, for example, the information about the margin between the threshold value used for topology determination and the actual value may be used, in other words, the more the margin from the threshold value, the greater the likelihood of correctness of the topology information.

Embodiment 4

Hereinafter, Embodiment 4 of the present invention is described in detail using an specific example.

Embodiment 4 describes an example of frequency band setting according to a communication category.

Figure 12:
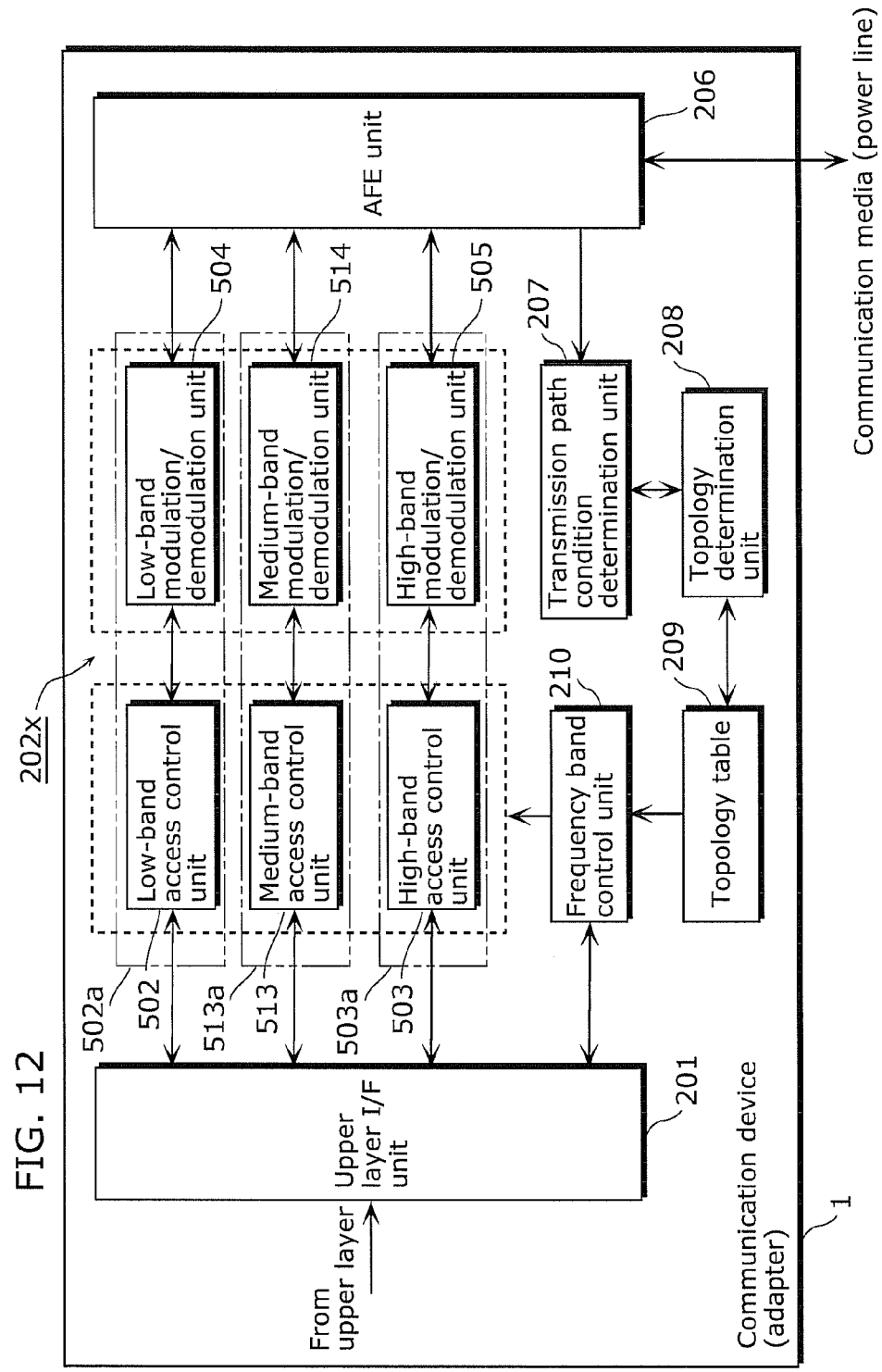
FIG. 12 is a diagram showing the configuration of a communication device.

FIG. 12 is a block diagram showing the functional configuration of the communication device 1 according to Embodiment 4 of the present invention.

In FIG. 12, the same components as in FIG. 7 are denoted by the same reference symbols, and their repeated description is omitted as appropriate.

In FIG. 12, Embodiment 4 differs from Embodiment 2 in that a medium-band access control unit 513 and a medium-band modulation/demodulation unit 514 (a medium-band processing unit 513*a*) for medium-frequency band between the low-band and the high-band are newly added.

In this manner, it may be understood that the medium-band processing device 513*a* is added, and the high-band processing unit 503*a* corresponds to the high-band processing unit 203*a* in FIG. 2, while the low-band processing unit 502*a* corresponds to the low-band processing unit 202*a* in FIG. 2, or other understanding may be possible.

For example, it may be understood that the low-band processing device 502*a* is added, and the high-band processing unit 503*a* corresponds to the high-band processing unit 203*a* in FIG. 2, while medium-band processing unit 513*a* corresponds to the low-band processing unit 202*a* in FIG. 2.

The low-band processing unit 502*a* may be used, for example, for the communication of the data for controlling household electrical equipment as described in detail later.

An upper layer I/F unit 201 notifies the information about a communication category to a frequency band control unit 210.

A frequency band control unit 210 controls the frequency band to be used based on the notified information about the communication category, and a topology table.

Also, in Embodiment 4, the frequency band is divided into three sub-bands, the low-band (2 MHz or less), the medium-band (2 MHz to 30 MHz), and the high-band (30 MHz to 400 MHz). Here, the division of the frequency band is not limited to the above division, and may be divided into a high-band, a medium-band, and a low-band in decreasing order of frequency.

Hereinafter, a specific procedure for controlling the frequency band is described.

Figure 13:
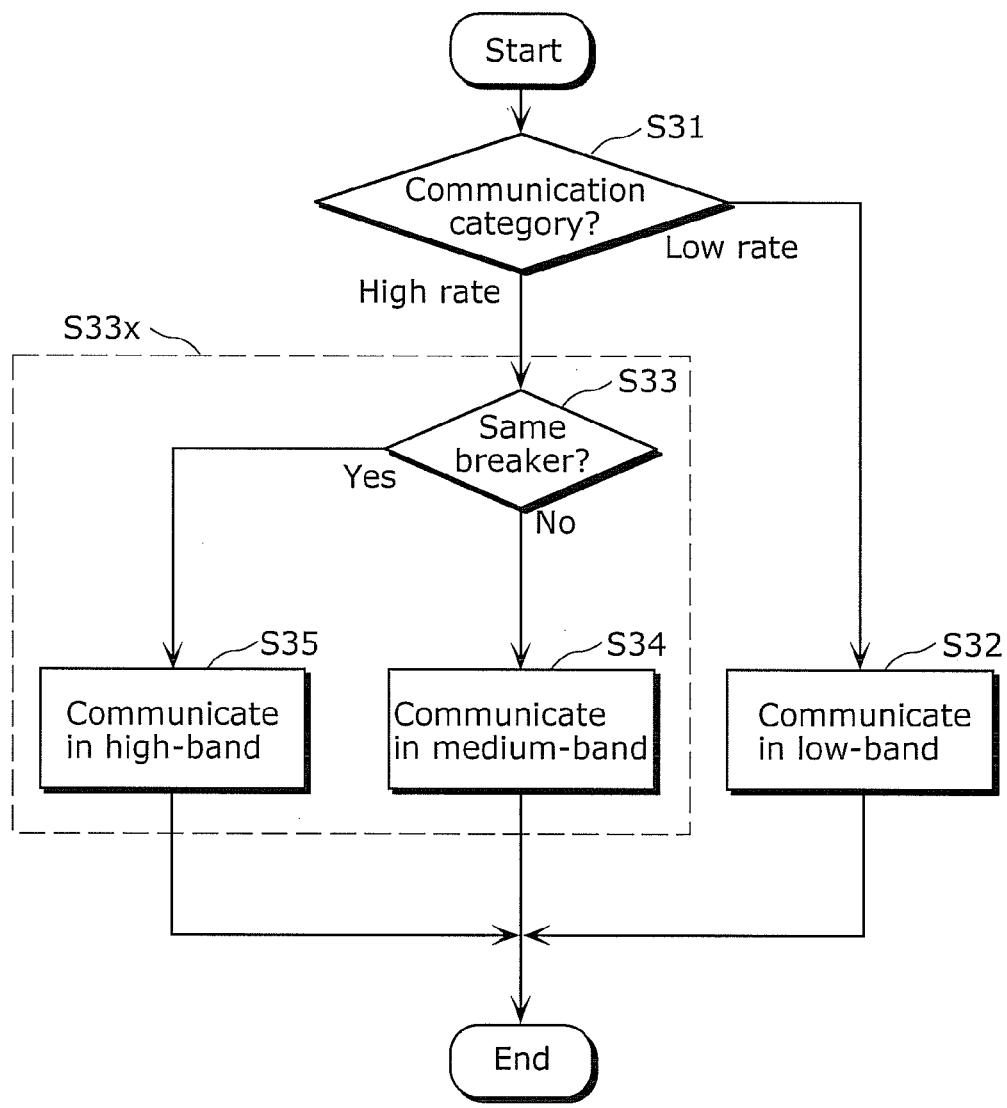
FIG. 13 is a flowchart showing the procedure for frequency band control based on a communication category.

FIG. 13 is a flowchart showing the procedure for frequency band control based on a communication category.

The frequency band control unit 210 starts its frequency band control by determining which band is used from the low-band, the medium-band, and the high-band, based on the information about the communication category notified from the upper layer I/F unit 201 (step S31).

When the communication category is the communication of low rate applications such as household electrical equipment control, for example, brightness, ON/OFF control of light (step S31: low rate), communication is performed using the low-band (step S32).

Thereby, decrease of the overall communication efficiency is reduced by avoiding inefficient communication in the medium-band and the high-band.

On the other hand, when the communication category is the communication of high rate applications such as uncompressed AV signal transmission between equipment (step S31: high rate), the process proceeds to step S33, and it is determined whether or not the communication device 1 and the destination communication device are connected to the same breaker, based on the topology table 209 (step S33).

Also, in step S33, the process S02*x* in FIG. 5 (or the entire process including S02*x*, S04, and S05) may be performed.

And when it is determined that the two communication devices are not connected to the same breaker (step S33: No), high-speed communication is performed using the medium-band (step S34).

On the other hand, when it is determined that the two communication devices are connected to the same breaker (step S33: Yes), super high-speed communication is performed using the high-band (S35).

After which frequency band is used from the medium-band and the high-band, the frequency band control unit 210 notifies the information about the frequency band or transmission rate to be used to the upper layer I/F unit 201.

The upper layer may select, for example, a data format used for transmission based on the notified information. For example, the upper layer I/F unit 201, when starting video transmission, may select an uncompressed AV signal format for transmission when super high-speed communication is possible, or select a compressed video data format for transmission when super high-speed communication is impossible.

In step S33, it is determined whether or not two communication devices are connected to the same breaker, then a frequency band to be used is determined, however, the determination process is not limit to this.

For example, the requirement (such a the above-described average CINR, and average attenuation) of the transmission path for enabling super high-speed communication may be preset and the result of determination as to whether or not super high-speed communication is possible may be stored in the topology table along with the topology information when the topology determination is made.

Then in step S33, a frequency band to be used may be determined based on the result of determination as to whether or not super high-speed communication is possible. Thereby, in the case where the two communication devices connected to the same breaker, but super high-speed communication is impossible, an attempt to start super high-speed communication can be avoided.

In the present embodiment, the communication devices 1 is configured to be communicatable with other device in three frequency bands: the low-band, the medium-band, and the high-band, however, the configuration is not limited to this. Each communication device in the power line communication system may be configured to be communicatable with other device in only one or two frequency bands.

By the procedure as shown above, the frequency band is controlled according to the content of a communication. With such a configuration the frequency band control unit 210 control frequency band according to the transmission path characteristics of the destination communication device, and the content of communication packets, thus the communication packets required to have QoS can be efficiently transmitted without significantly reducing the communication efficiency of the entire communication path.

In short, according to the present technique, the overall communication efficiency can be improved by efficiently using one of a plurality of frequency bands according to the transmission path characteristic of each frequency band. For example, in a communication device, the frequency band usable for communication is divided into the first frequency band and the second frequency band whose transmission path characteristic is poorer than that of the first frequency band; the transmission path characteristics in the first and second frequency bands are detected for each of a plurality of other communication devices; any one of the other communication devices whose transmission path characteristic in the second frequency band satisfies predetermined criteria is classified in the first group; any one of the other communication devices whose transmission path characteristic in the second frequency band does not satisfy predetermined criteria is classified in the second group; and the frequency band used for communication with one of the other communication devices as the communication destination is controlled based on whether it is classified in the first group or the second group.

Accordingly, for example, the following operation may be performed in a certain aspect.

In the present communication device (communication adapter) 1 (in FIG. 4, FIG. 2), the power line communication 7 (FIG. 4) via the power line 107 for supplying power may be performed with the destination device 1$x$ (FIG. 4).

The power line 107 is, for example, a power line which supplies power to household appliances such as a television, a refrigerator that are provided in a house 4$h$.

The communication device 1 is inserted in e.g., an outlet 1$c$ connected to the power line 107, for example, the communication device 1 includes e.g., a plug 1$p$ having two conductive edges, and the plug 1$p$ is inserted in the outlet 1$c$ so that the power line communication 7 via the power line 107 connected to the outlet 1$c$ may be performed.

Specifically, for example, the present communication device 1 may be an adapter which is connected to an upper device 1$e$ as a household appliance such as a personal computer, a television via an Ethernet cable 108 (FIG. 1, FIG. 2) so as to enable communication between (a computer connected to) the destination device 1$x$ and the upper device 1$e$ connected to the present communication device 1 via the power line communication 7 between the communication device 1 and the destination device 1$x$.

However, the power line communication 7 as shown above is a new type of communication which has not been used before, but has been started to be used recently.

For this reason, not much is known about the power line communication 7.

In addition, not only the case (see, for example, "S13: No" in FIG. 8, "S41: No" in FIG. 18) where the volume of data such as video data transmitted by the power line communication 7 per unit time is large, but also the case where data volume is small can be assumed.

In other words, it can be assumed that the power line communication 7 is preferably performed in the entire band 101A (FIG. 16) as the largest band which is available only when the data volume is large and required speed in communication is high (such as "S13: No" in FIG. 8, "S41: No" in FIG. 18) (see e.g., S14, S42$n$).

Thus, the following operation may be performed in the case (see "S33: Yes" and "S41: No") where the data volume is small.

The power line communication 7 may be performed in a partial band 101$p$ (FIG. 16) of the entire band 101A.

However, the case may assumed that while the power line communication 71 is performed with the destination device 1$x$1 (FIG. 4), the other power line communication 72 is performed with the other destination device 1$x$2 (FIG. 4) (for example, simultaneously with the power line communication 71).

Thus, in these cases, the power line communication 7L (FIG. 4) may be performed in the low-band 101L as a partial band 101$p$ lower than the threshold value ThF (FIG. 16), while the power line communication 7H may be performed in the high-band 101H as a partial band 101$p$ higher than the threshold value ThF.

That is to say, by performing the power line communication 7H in the high-band 101H also, two power line communications 7L and 7H may be performed in two bands 101$p$, i.e., the low-band 101L and the high-band 101H so that two power line communications 71 and 72. i.e., the power line communication 71 with the first destination device 1$x$1, and the power line communication 72 with the second destination-device 1$x$2 may be performed simultaneously.

However, on the assumption of such a case, when the power line communication 7H is performed in the high-band higher than the threshold value ThF, the quality of the communication may be reduced as described in detail below.

It can be assumed that the line communication 71 is the power line communication 7 not through the breaker 401$b$ (the distribution board 401 in FIG. 4), while the other line communication 72 is the power line communication 7 through the breaker 401$b$.

In other words, it can be assumed that the destination device 1$x$ for the power line communication 7 may be not only the first destination device 1$x$1 which is connected to the same breaker as the breaker 4011 to which the present communication device 1 is connected, and the power line communication 71 is performed with the first destination device 1$x$1 not through a different breaker, but also the second destination device 1$x$2 which is connected to a different breaker 4012 from the breaker 4011, through which the power line communication 72 is performed.

For example, in the power line communication 71 with the first destination device 1$x$1 through the same breaker 4011, the power line communication 7 is performed not through the breaker 401$b$ (such as the breaker 4011) where (absolutely, or almost) no signal of the power line communication 71 is passed through the portion toward the breaker 4011 from a point (see the point 4011P in FIG. 4) so that the power line communication 7 is performed not through the breaker 401$b$ (such as the breaker 4011).

On the other hand, in the power line communication 72 with the second destination device 1$x$2 through the same breaker 4012, the power line communication 7 is performed through the breaker 401$b$ (for example, the same breaker 4011 and another breaker 4012) where (all) signals of the power line communication 71 are passed through the portion toward the breaker 4011 from the above-mentioned point (see the point 4011P).

FIG. 14 is a chart showing a graph of a received power 8.

The scale of the vertical axis in the lower graph of FIG. 14 is normalized (signal gain, dB (decibel)) by dividing the amount of the received power 8 by the amount of transmitted power when the power is transmitted. Multiplying the normalized value by the transmitted power gives the value of the received power 8.

The higher the received power 8, the higher the quality of the communication, indicating higher (improved) transmission characteristic in data transmission in the power line communication 7.

Then the received power 82 in the lower graph indicates the received power in the power line communication 72 with the second destination device 1x2 through the breaker 401b.

The received power 822 (portion) of the received power 82 in the high-band 101H higher than the threshold value ThF is (considerably) low enough so that the quality of the communication in the power line communication 72 in the high-band 101H is reduced.

In other words, the received power 82 has a reduction (attenuation) equivalent to a significant difference 207h2 between the received power 821 in the low-band 101L and the received power 822 in the high-band, and the received power 822 in the high-band 101H is low enough so that the quality of the communication is reduced (see a cross "x" in the 3rd row, 3rd column in the upper table of FIG. 14).

In other words, when general type of communication other than the power line communication 7 is performed, or communication is performed through a through device other than the breaker 401b, a significant difference 207h (FIG. 14) occurs that rarely occur in other cases, thus the quality of the communication is reduced.

Thus, when the power line communication 7a2 (FIG. 4) is performed in the low-band 101L in the power line communication 72 with the second destination device 1x2 through the breaker 401b, the quality of the communication is not reduced, while when the power line communication 7b2 is performed in the high-band 101H, the quality of the communication is reduced (see the 3rd row in the upper table of FIG. 14).

A preliminary estimate of the throughput in the communication is, for example, as follows.

for the received power 81 between the present communication device and the first destination device 1x1 through the same breaker, the throughput of the communication with the received power 811 in the low-band 101L is estimated to be 50 Mbps, while the throughput of the communication with the received power 812 in the high-band 101H is also estimated to be 50 Mbps.

On the other hand, for the received power 82 between the present communication device and the second destination device 1x2 through the same breaker, the throughput of the communication with the received power 811 in the low-band 101L is estimated to be 40 Mbps, while the throughput of the communication with the received power 812 in the high-band 101H is also estimated to be 10 Mbps.

Thus, the reduction in the throughput due to the significant difference 207h is, for example, 40 Mbps−10 Mbps=30 Mbps ($^{10}/_{40}$=25%).

When the power line communication 7a2 is performed in the low-band 101L between the present communication device and the second destination device 1x2 through the breaker 401b, the power line communication 7a11 is performed in the high-band 101H between the present communication device and the first destination device 1x1 not through the breaker 401b (case 7Ca: FIG. 4)

Conversely, when the power line communication 7b2 is performed with the second destination device 1x2 in the high-band 101H, the power line communication 7b11 is performed with the first destination device 1x1 in the low-band 101L (case 7Cb)

As a result, in the former case Ca between these cases Ca, Cb, the power line communication 7a12 is performed in the high-band 101H in the power line communication 1b2x by the second destination device 1x2 with other device (for example, the communication device 1B1) connected to the same breaker as the breaker 4012 to which the second destination device 1x2 is connected.

On the other hand, in the latter case 7Cb, the power line communication 7b12 is performed in the low-band 101L in the power line communication 1b2x by the second destination device 1x2 not through the breaker 4012.

For this reason, in the case 7Ca, the power line communication 7a2 is performed, and the quality of the communication is improved, while in the case 7Cb, the power line communication 7b2 is performed, and the quality of the communication is reduced.

Furthermore, it can be assumed that after the power line communication 72 is completed, the power line communication 72 may be performed for the second time.

In the case 7Ca, the power line communication 7a12 in the high-band 101H is performed by the second destination device 1x2, and also in the power line communication 72 for the second time, the power line communication 7a12 in the high-band 101H is performed, thus the quality of the communication is improved in many cases.

On the other hand, in the case 7Cb, the power line communication 7b12 in the low-band 101L is performed by the second destination device 1x2, and in the power line communication 72 for the second time, the power line communication 7a12 in the high-band 101H is performed, thus the quality of the communication is reduced in many cases.

Thus, it may be determined (by the topology determination unit 208, S02x) whether the power line communication 7 (such as the power line communication 7H) with the destination device 1x via the power line 107 is performed through the breaker 401b (predetermined through device) or not.

The first destination device 1x1 with which the power line communication 71 is performed is connected to the same breaker as the breaker 4011 to which the present communication device 1 is connected, and the first destination device 1x1 with which the other power line communication 72 is performed is connected to the breaker 4012 different from the breaker 4011 to which the present communication device 1 is connected.

Thus, the above-described determination may be made by, for example, determining whether the destination device 1x is the first destination device 1x1 connected to the same breaker 4011, or the second destination device 1x2 connected to another breaker 4012.

That is to say, the first destination device 1x1 is included in the first group 1G1 defined by a plurality of communication devices (the communication devices 1A1 to 1A4) connected to the same breaker 4011, while the second destination device 1x2 is included in the second group 1G2 defined by a plurality of communication devices (the communication devices 1B1 to 1B4) connected to another breaker 4012.

Thus, the above-described determination may be made by determining whether the destination device 1x is included in the first group 1G1 or the second group 1G2.

Specifically, the information 8d (FIG. 2) showing (indicating) the received power 8 (see the graph in FIG. 14) in the power line communication 7 with the destination device 1x may be acquired (calculated, received) (see the transmission path state determination unit 207 (the transmission path state determination unit 207 and the topology determination unit 208), S01 in FIG. 5).

For example, when the received power 8 is varied, the information 8d may be changed corresponding to the variation so that the varied received power 8 is indicated by the changed information 8d (the above-described CINR).

The information 8d may identify, for example, one range out of a plurality of ranges so that the power within the identified range may be indicated as the received power 8.

Specifically, the acquired information 8d may indicate, for example, both of the received power 8x1 (FIG. 14) in the low-band 101L and the received power 8x2 in the high-band 101H.

When the difference 207h (FIG. 14) between the indicated received power 8x1 in the low-band 101L (such as the received power 821) and the indicated received power 8x2 in the high-band 101H (such as the received power 822) is not comparable to the significant difference 207h2 (more than a predetermined threshold value), the destination device 1x may be determined to be the first destination device 1x1 connected to the same breaker 401l, otherwise, the destination device 1x may be determined to be the second destination device 1x2.

Figure 15:
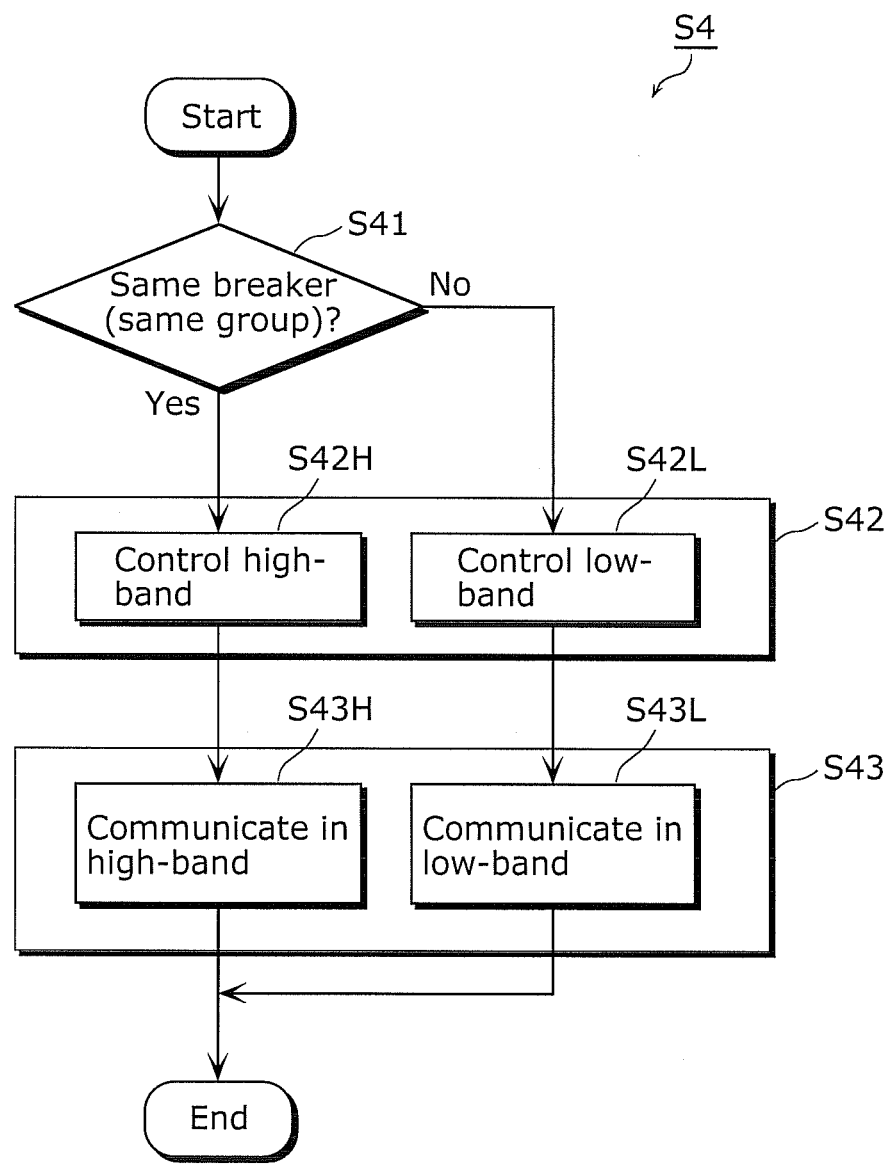
FIG. 15 is a flowchart for processing communication device.

FIG. 15 is a flowchart for processing communication device.

There may be a case (see the case where the power line communication 7 is performed in a partial band 101p: S16, S12 in FIG. 8, FIG. 15, S42m of FIG. 18) other than the case where the power line communication is performed in the entire band 101A (see S14 in FIG. 8 and S42n in FIG. 18), the largest available band including both the low-band 101L lower than the threshold value ThF and the high-band 101H higher than the threshold value ThF.

In this case, the power line communication 7H in the high-band 101H may be performed.

The power line communication 7H may be such that while the power line communication 7H is performed, only the other power line communication 7L (7a11, 7a12) in the low-band 101L may be performed as the power line communication 7 other than the power line communication 7H (simultaneously with the power line communication 7H), and the other power line communication 7H (7b11, 7b12) in the high-band 101H may not be performed.

The power line communication 7H in the high-band 101H may be performed with only the first destination device 1x1 for which the power line communication 7 therewith is determined to be the power line communication 71 not through the same breaker.

Moreover, the power line communication 7H in the high-band 101H may not be performed with the second destination device 1x2 for which the power line communication 7 therewith is determined to be the power line communication 72 through the same breaker (the communication unit 202x, S43L).

Accordingly, only the power line communication 7a11 with the first destination device 1x1 is performed as the power line communication 7H (FIG. 4) in the high-band 101H, and the power line communication 7b2 with the second destination device 1x2 may not be performed.

That is to say, for example, the communication unit 202x may be controlled so as to perform these operations (the frequency band control unit 210, S42 in FIG. 15).

In other words, the power line communication 7L in the low-band 101L may not be performed with in the first destination device 1x1, but may be performed only with the second destination device 1x2.

That is to say, the high-band 101H may be selected as a band 101p1 (FIG. 4) for the power line communication 71 with the first destination device 1x1, while the low-band 101L may be selected as a band 101p2 (FIG. 4) for the power line communication 72 with the second destination device 1x2 (case 7Ca).

In other words, the following operation may not be performed: the low-band 101L is selected as the band 101p1, and the high-band 101H is selected as the band 101p2 (case 7Ca).

Accordingly, the power line communication 7b2 with reduced quality due to the significant difference 207h2 is prevented from being performed, and only the power line communication 7a2 with higher quality is performed, thus the quality of communication can be improved.

Furthermore, the significant difference 207h2 which rarely occurs in the known previous implementations occurs, but is eliminated, thus the quality of communication can be improved and a relatively significant improvement can be achieved.

For example, the operations in the case 7Ca are performed; no operation is performed in the case 7Cb; the power line communication 7a12 in the high-band 101H is performed by the second destination device 1x2, but the power line communication 7b12 in the low-band 101L is not performed, preventing the quality of the communication to be reduced in many cases, thus the quality of the communication can be improved in many cases.

In this manner, a plurality of configurations (such as the topology determination unit 208) are combined, and the synergy effect from the combination is produced.

On the other hand, in the known previous implementations, part of all of these configurations is lacking, thus no synergy effect is produced.

Furthermore, in many of the previous implementations, the power line communication 7 is not performed, and the power line communication 7 in the entire band 101A is just performed, or the power line communication 7 in a partial band 101p is not performed, and the power line communication 72 through the breaker 401b is not performed. Also, the above-described significant difference 207h2 (FIG. 14) which causes the reduced quality of the communication is probably not produced.

For this reason, it is difficult to think of the present technique from the previous implementations.

Thus, a communication system (power line communication system) 4 may be formed that includes multiple pieces of the present communication device 1 (such as the communication devices 1A1, 1A2, and the communication devices 1B1, 1B2) which are to be inserted in, for example, a plurality of the outlets 1c connected to the power line 107 for supplying power, provided in the house 4h (FIG. 4).

Also, data (see the description shown above) indicating whether the destination device 1x of the power line communication 7 is the first destination device 1x1, or the second destination device 1x2 may be acquired, the data being transmitted by transmission devices (for example, the communication devices A2 to A4 in the 3rd to 5th rows of the table in FIG. 10 (for example, the devices in the first group 1G1, such as the communication devices 1A2 to 1A4 in FIG. 4)) (S23).

This acquisition may be performed, for example, by the table correction unit 212 (the determination unit 208x), or the transmission path state determination unit 207.

Then in the case where the acquired data indicates that the destination device 1x is the first destination device 1x1, the destination device 1x may be determined to be the first destination device 1x1, and in the case where the acquired data indicates that the destination device 1x is the second destination device 1x2, the destination device 1x may be determined to be the second destination device 1x2 (the table correction unit 212).

Specifically, for example, the above-described transmission devices may also include a plurality of communication devices (the communication devices A2 to A4), and the entire data (described above) including data portions may be acquired by receiving each data portion transmitted by each communication device.

Then, for example, each data portion may indicates whether the destination device 1x is the first destination device 1x1 or the second destination device 1x2.

In the case where data portions indicate the first destination device 1x1 where the number of data portions is the threshold value (for example, half of the number of the received data portions, or the number itself) or greater, the acquired data indicates the first destination device 1x1, thus the destination device 1x may be determined to be the first destination device 1x1.

Furthermore, in the case where data portions indicate the second destination device 1x2 where the number of data portions is less the threshold value, the acquired data indicates the second destination device 1x2, thus the destination device 1x may be determined to be the second destination device 1x2.

Only when the result of such determination based on the acquired data (the first destination device 1x1, or the second destination device 1x2) is different from the previously made determination (see S22) (S24: No), the content of the data (the topology table 209) indicating the result of the determination may be changed, otherwise (S24: Yes), the content may not be changed.

More specifically, for example, the above-described first determination (S22 in FIG. 11) may be made by the topology determination unit 208, while the above-described second determination (such as S23) may be made based on the acquired data.

That is to say, for example, it may be determined whether or not predetermined conditions are satisfied in S23 of FIG. 11.

Then in the case where it is determined that predetermined conditions are not satisfied, the second determination may be made.

For example, while the power line communication 7 based on the first determination is performed (for example, between S22 and S23), information indicating that the first determination is not appropriate may be detected, the information indicating for example that the number of retransmit by the power line communication 7 is greater than the threshold value.

That is to say, for example, when a determination is made in S23 as to whether or not a condition with which such information is not detected is satisfied, and it is determined that the condition is not satisfied (when the information is detected), the second determination may be made (see the description of e.g., S23 to S25 shown above).

That is to say, for example, when it is determined that the condition is not satisfied as described above, the power line communication 7 based on the first determination (S22) may be stopped, while the second determination is made (such as S23 to S25) so that the power line communication 7 based on the second determination made may be started.

For example, only when the predetermined conditions are satisfied ("S1: low-band" in FIG. 8, or the case of "S11: high-band", "S13: Yes", and "S15: No", or the case of "S31: high rate" in FIG. 13), the power line communication 7 may be performed in the band (the high-band 101H, the low-band 101L) corresponding to the destination device 1x (the first destination device 1x1 or the second destination device 1x2) as described above (see steps such as S12, S16, S35, S34).

Then in the case (S13: No, S15: Yes, S31: low rate) where the conditions are not satisfied, the power line communication 7 may be performed in the band (see the entire band 101A in S14, the low-band 101L in "S15: Yes", the entire band 101A in S32) other than the above-described corresponding band.

Thereby, in the case where conditions are not satisfied, improper communication can be prevented, thus proper communication (such as S14) can be performed securely.

Specifically, as shown in FIG. 8, even when the corresponding band is the high-band 101H, for example (S11: high-band in FIG. 8), only when the conditions are satisfied (S13: Yes, S15: No), the power line communication 7H (7a11) in the high-band 101H may be performed (S16), and when the conditions are not satisfied (S13: No, or S15: Yes), the power line communication 7 in other bands (the entire band 101A (S14), the low-band 101L (S12)) may be performed.

The above-described conditions includes, for example, a condition that the data transmitted by the power line communication 7 is not the predetermined data.

For example, only when the data transmitted by the power line communication 7 is not the predetermined data, the power line communication 7 may be performed in the corresponding band.

For example, the predetermined data may be those data with which it is inappropriate to perform the power line communication 7H (7a11) in the high-band 101H.

For example, the predetermined data may be the first data, or the second data shown in the following.

That is to say, the first data may be those data with which it is more appropriate to perform communication in the entire band 101A (see e.g., S13: No, S14).

Specifically, for example, the first data may be such that the volume of data transmitted per unit time is larger (than the threshold value), for example, the first data may be video data whose (quality is higher (than predetermined quality)). For example, the first data like this may be transmitted in the entire band 101A (S14).

Also, the second data may be, for example, such that it is more appropriate to transmit the data in a low-band (e.g., the low-band 101L) rather than in the high-band 101H (see S15: Yes).

Specifically, for example, the second data may be such that the above-described priority is higher than (the priority of the other data).

For example, the second data may be such that communication of the data is almost required to be successful.

For example, the second data may be VOIP data described above. That is to say, the second data may be such that in the case where the data transmission delay exceeds a predetermined upper limit of delay time due to repeated failure of transmission of the data, so-called sound skip occurs while reproducing the data transmitted, thus causing a major problem.

Also, as shown in FIG. 13, for example, in either case where the corresponding band is the high-band 101H (see S33: Yes), or where the corresponding band is the low-band 101L (S33: No), only when required the conditions are satisfied (S31: high speed), the power line communication 7 in the corresponding band may be performed.

Then, in either case where the corresponding band is the high-band 101H (see S33: Yes), or where the corresponding band is the low-band 101L (S33: No), when required the conditions are not satisfied (S31: low speed), the power line communication 7 may be performed in the (previously described) band processed by the low-band processing unit 502a (FIG. 12).

For example, the above-described conditions may be such that the data to be transmitted is not the third data shown in the following.

That is to say, the third data is such that the power line communication 7 may be performed with the third data in the (previously described) band processed by the low-band processing unit 502a (FIG. 12).

That is to say, the third data may be, for example, such that when transmission of the data fails, a (major) problem occurs that would not occur when transmission of the other data fails.

Specifically, for example, the third data may be data for control (such as control data) such that the third data is transmitted from a control device to equipment (household appliance such as a personal computer, a television, or upper device 1e (FIG. 1)) so that the equipment is controlled by the control device.

Specifically, for example, the third data is control data with which the equipment is controlled so that its power consumption is reduced.

That is to say, the third data may be such that in the case where communication of the data fails, the power consumption of the equipment remains to be high.

For example, the third data may be such that in the case where communication of the data fails, the breaker 401b may trip, or the power consumption of the equipment is not reduced resulting in an eco-management failure.

The band processed by the low-band processing unit 502a is specifically lower than the high-band 101H, and further lower than the low-band 101L.

Accordingly, up to the third data, the power line communication 7 is performed in the (previously described) corresponding band, thus a (major) problem caused by a failure of transmission can be avoided, and stable communication state free from a (major) problem due to communication failure can be maintained.

The band processed by the low-band processing unit 502a is such that when the power line communication 7 is performed in the band, not only in the case where the distance of communication is a first distance shown in the following, but also in the case where the distance of communication is a second distance shown in the following, the probability of communication failure is relatively low. Here, the first distance is a relatively short distance such as the distance between two locations in the same room on the same floor in the house 4h. The second distance is a relatively far distance such as the distance between two locations in two different rooms, or the distance between two locations on two different floors. Also, the probability of communication failure is relatively low means that compared with the probability of communication failure in the other band except the relevant band, the probability of communication failure in the relevant band is relatively low.

For example, other data except the third data with which the power line communication 7 (S35, S34) in the corresponding band is performed may be, for example, the data transmitted between a television and a device in the same room, the device transmitting an image to the television to be displayed by the television.

The corresponding band (such as the band 101L) may be such that the probability of failure occurrence in performing the power line communication 7 in the band with the above-described relatively far distance, is higher than that in performing the power line communication 7 in another band.

The third data is e.g., data for control as described previously, and is, for example, data with a relatively small volume.

Thus, for example, the band processed by the low-band processing device 502a may be a band narrower than the above-described high-band 101H. Also, the band processed by the low-band processing device 502a may be a band narrower than the low-band 101L. For example, the band processed by the low-band processing device 502a may be narrower than any of the high-band 101H and the low-band 101L.

The communication performed by the present communication device 1 is not the power line communication 7 on the power line 107 for supplying AC power, which may be generally expected today, but may be the power line communication 7 on the power line 107 for supplying DC power, which may be assumed in the future.

Thus, in order to show that the communication performed by the present communication device 1 is not limited to the power line communication 7 in AC, the communication performed by the present communication device 1 is simply referred to as "communication" as appropriate and not referred to as "power line communication."

Thus, equipment installed for other purpose (power supply) is used as communication media (see the power line 107, the character of the "communication media" shown in FIG. 2) in the communication to perform the communication (the power line communication 7).

For this reason, in the case where communication is performed through a through device (the breaker 401b), the significant difference 207h occurs, and some through devices may have reduced quality of the communication.

Accordingly, by performing the above described operations, the quality of the communication can be prevented from being deteriorated, thus can be improved.

On the other hand, in the future, it needs to be assumed that communication is performed via a coaxial cable which is connected to a television and installed for the use of operating the television properly.

Thus, the present communication device 1 performs communication via a coaxial cable rather than the power line communication 7 via the power line 107, and may serve as a device which improves the quality of the communication using the above-described principles of the operation when such a communication with a coaxial cable is performed.

That is to say, the communication in the present communication is e.g., power line communication via the power line diverted for the communication, and specifically, may be the power line communication 7 in AC, or the power line communication 7 in DC, or the communication via a coaxial cable described above.

For example, the low-band 101L is e.g., a band adjacent to the high-band 101H.

In the mere details in such operations, the previously-described operations may be performed, or other operations such as an appropriate operation easily executed, except the previously-described operations may be performed. In the mere details, operations to which further improved invention is applied may be performed.

In the communication device 1, for example, a computer program 105P (FIG. 1) may be used, the computer program for achieving one or more of the above-described functions in a predetermined computer (for example, CPU 105) provided in the communication device 1. The computer program 105P may be stored, for example, in a memory 103.

For example, an integrated circuit 102C (FIG. 1) in which one or more of the above-described functions are implemented may be provided in the communication device 1.

Thus, for example, the communication unit may receive a classification result (such as data indicating the group in which a first other communication device is classified) created by a second other communication device from the second other communication device (such as the communication device A2 in FIG. 10), and the determination unit may classify first other communication device except the second other communication device (for example, the communication device B1 in FIG. 10) which has been classified in the first or the second group, in either one of the first group and the second group (such as group indicated by the data) based on the received classification result.

Thus, for example, the communication unit may receive a classification result (such as data of group in which a fourth other communication device is classified) created by a third other communication device from the third other communication device, and the determination unit may correct the classification result (such as classification data of the fourth other communication device) created by the communication device provided with the determination unit based on the received classification result.

So far, the present invention has been described in detail by showing exemplary Embodiments 1 to 4, however, the above description is only illustrative of the present invention in any sense, and is not intended to limit the scope of the present invention. It is needless to state that various improvements and modifications can be made to Embodiments 1 to 4 without departing from the scope of the present invention.

For example the present invention may be achieved not only as a device (system), but also as a method including the steps which are defined by the operations of the processing means constituting the device, or as a program which causes a computer to execute those steps, or as a recording medium such as a computer readable CD-ROM storing the program, or as information, data, or signals indicating the program. These programs, information, data, and signals may be distributed via a network such as the Internet.

As long as not departing from the spirit of the present invention, the embodiments obtained by making various changes, which occur to those skilled in the art, to the above-described embodiments and modifications, and other embodiments obtained by arbitrarily combining the components of the embodiments and modifications are also included in the scope of the present invention.

A communication device and a communication method according to the present invention enable each frequency band to be utilized efficiently according to the characteristics of the frequency band, and allow the overall communication efficiency to be improved, thus are useful to e.g., a communication network system having respective transmission characteristics of frequency bands.

The quality of the communication can be improved and a significant improvement can be achieved.

REFERENCE SIGNS LIST

1 Communication device
1x Destination device
1G1 First group
1G2 Second group
101 Analog front end
101A Entire band
101L Band
101H Band
102 Power line communication physical layer
103 Memory
104 Power line communication MAC layer
105 CPU
106 Ethernet™ module
107 Power line
108 Ethernet™ cable
201 Upper layer I/F unit
202 Low-band access control unit
202x Communication unit
203 High-band access control unit
204 Low-band modulation/demodulation unit
205 High-band modulation/demodulation unit
206 AFE Unit
207 Transmission path state determination unit
208 Topology Determination Unit
209 Topology Table
210 Frequency band control unit
211 Communication monitoring unit
212 Table correction unit
213 Medium-band access control unit
214 Medium-band modulation/demodulation unit
301 Transmission path state determination unit
302 Channel control unit

The invention claimed is:

1. A communication device comprising:
a detection unit configured to detect a transmission path characteristic in communication with each of other communication devices;
a determination unit configured to classify a communication device out of the other communication devices into a first group when the detected transmission path characteristic satisfies a predetermined criterion, and to classify a communication device out of the other communication devices into a second group when the detected transmission path characteristic does not satisfy the predetermined criterion;
a control unit configured to select a frequency band used for communication with another communication device that is a communication destination, from among a first frequency band and a second frequency band higher than the first frequency band, based on whether the other communication device that is a communication destination is classified into the first group or into the second group, the first and second frequency bands being obtained by dividing an entire frequency band used for communication; and
a communication unit configured to perform communication with the other communication device that is a communication destination using the selected frequency band,
wherein the determination unit is configured to determine that the detected transmission path characteristic satisfies the predetermined criterion when the communication device out of the other communication devices is connected to a first breaker to which the communication device comprising the determination unit is connected, and to determine that the detected transmission path characteristic does not satisfy the predetermined criterion when the communication device out of the other communication devices is not connected to the first breaker.

2. The communication device according to claim 1, wherein the communication unit is configured to receive a result of the classification made by another communication device from the other communication device, and the determination unit is configured to classify any communication device except the other communication devices into either the first group or the second group, based on the received classification result, the other communication devices already being classified into the first group and the second group.

3. The communication device according to claim 2,
wherein the communication unit is configured to receive a result of the classification made by another communication device from the other communication device; and
the determination unit is configured to correct a classification result made by the communication device comprising the determination unit, based on the received classification result.

4. The communication device according to claim 3,
wherein the determination unit is configured to classify the other communication device into the second group when the transmission path characteristic detected in the first low-frequency band is less than or equal to a predetermined threshold value.

5. The communication device according to claim 4,
wherein the first group includes each communication device connected to a same breaker as a breaker to which the communication device having the determination unit is connected;
the second group includes each communication device connected to another breaker;
the determination unit is configured to determine whether the other communication device that is a communication destination is connected to the same breaker, or connected to the other breaker;
the communication unit is configured to perform, as power line communication via a power line in the second high-frequency band, only power line communication with a first other communication device determined to be connected to the same breaker; and
the communication unit is configured to perform, as power line communication via a power line in the second high-frequency band, no power line communication with a second other communication device determined to be connected to the other breaker.

6. The communication device according to claim 5,
wherein the communication unit is configured to perform, as power line communication in the first low-frequency band, no power line communication with the first other communication device determined to be connected to the same breaker; and
the communication unit is configured to perform, as power line communication in the first low-frequency band, only power line communication with the second other communication device determined to be connected to the other breaker.

7. The communication device according to claim 6,
wherein the power line communication in the first low-frequency band with the second other communication device determined to be connected to the other breaker is such that while the power line communication is performed, the second other communication device performs power line communication in the second high-frequency band, with the other communication devices connected to the other breaker, except the second other communication devices.

8. The communication device according to claim 4,
wherein when the transmission path characteristic in the first low-frequency band detected for the other communication device is less than a first predetermined threshold value, the determination unit is configured to classify the other communication device that is a communication destination into the second group; and
when the transmission path characteristic is greater than or equal to the first predetermined threshold value, and a difference between the transmission path characteristic detected in the first low-frequency band and the transmission path characteristic in the second high-frequency band detected for the other communication device is less than a second predetermined threshold value, the determination unit is configured to classify the other communication device that is a communication destination into the first group, and when the transmission path characteristic in the first low-frequency band is greater than or equal to the first predetermined threshold value, and the difference is greater than or equal to the second predetermined threshold value, the determination unit is configured to classify the other communication device that is a communication destination into the second group.

9. The communication device according to claim 8,
wherein when the other communication device that is a communication destination is classified into the first group, the control unit is configured to select a second high-frequency band, as a frequency band used for communication with the other communication device that is a communication destination, and when the other communication device that is a communication destination is classified into the second group, the control unit is configured to select the first low-frequency band, as a frequency band used for communication with the other communication device that is a communication destination.

10. The communication device according to claim 9,
wherein only when a bit rate of data transmitted between the communication device and the other communication device that is a communication destination is less than or equal to a threshold level, the control unit is configured to control to allow communication between the communication device and the other communication device using either one of the first frequency band and the second frequency band; and when the bit rate of data is greater than the threshold level, the control unit is configured to control to allow communication between the communication device and the other communication device using the entire frequency band including both the first frequency band and the second frequency band.

11. The communication device according to claim 10,
wherein in communication with the other communication device that is a communication destination, the control unit is configured to control to allow communication in which the second high-frequency band is used only when the other communication device is classified into the first group and a priority of data to be transmitted is lower than a threshold value; and the control unit is configured to control to prohibit communication in which the second high-frequency band is used, but to allow communication in which the first low-frequency band is used when the other communication device is classified into the first group and the priority of data to be transmitted is greater than or equal to the threshold value.

12. A communication system comprising:
a plurality of communication devices,
each communication device including a plug to be inserted in one of a plurality of outlets connected to a power line for power supply provided in a house;

at least one of the communication devices including:
a determination unit configured to determine whether or not power line communication with a destination device that is another communication device is performed through a breaker, the power line communication being performed via the power line connected to the outlet in which the plug of the communication device is inserted; and
unless power line communication is performed in an entire frequency band including both a first frequency band lower than a threshold value and a second frequency band higher than the threshold value,
a communication unit performs, as the power line communication in the second high-frequency band, only power line communication with a first destination device determined to be not through a breaker, and perform no power line communication with a second destination device determined to be through a breaker,
wherein the communication unit is configured to perform power line communication in the second low-frequency band with the second destination device determined to be through a breaker; and
while the communication unit of the communication device performs the power line communication in the second low-frequency band with the second destination device, the second destination device performs power line communication in the first high-frequency band with the communication device connected to the same breaker as the breaker to which the second destination device is connected.

13. A communication method comprising:
detecting a transmission path characteristic in communication performed by a communication device with each of other communication devices except the communication device;
classifying a communication device out of the other communication devices into a first group when the detected transmission path characteristic satisfies a predetermined criterion, and classifying a communication device out of the other communication devices into a second group when the detected transmission path characteristic does not satisfy the predetermined criterion;
selecting a frequency band used for communication with another communication device that is a communication destination, from among a first frequency band and a second frequency band higher than the first frequency band, based on whether the other communication device that is a communication destination is classified into the first group or into the second group, the first and second frequency bands being obtained by dividing an entire frequency band used for communication; and
performing communication with the other communication device that is a communication destination using the selected frequency band,
wherein the classifying step determines that the detected transmission path characteristic satisfies the predetermined criterion when the communication device out of the other communication devices is connected to a first breaker to which the communication device comprising the determination unit is connected, and determines that the detected transmission path characteristic does not satisfy the predetermined criterion when the communication device out of the other communication devices is not connected to the first breaker.

14. An integrated circuit comprising:
a detection unit configured to detect a transmission path characteristic in communication performed by a communication device with each of other communication devices except the communication device;
a determination unit configured to classify a communication device out of the other communication devices into a first group when the detected transmission path characteristic satisfies a predetermined criterion, and to classify a communication device out of the other communication devices into a second group when the detected transmission path characteristic does not satisfy the predetermined criterion;
a control unit configured to select a frequency band used for communication with another communication device that is a communication destination, from among a first frequency band and a second frequency band higher than the first frequency band, based on whether the other communication device that is a communication destination is classified into the first group or into the second group, the first and second frequency bands being obtained by dividing an entire frequency band used for communication; and
a communication unit configured to perform communication with the other communication device that is a communication destination using the selected frequency band,
wherein the determination unit is configured to determine that the detected transmission path characteristic satisfies the predetermined criterion when the communication device out of the other communication devices is connected to a first breaker to which the communication device comprising the determination unit is connected, and to determine that the detected transmission path characteristic does not satisfy the predetermined criterion when the communication device out of the other communication devices is not connected to the first breaker.

15. A non-transitory computer readable recording medium on which a program is recorded, the program causing a computer to execute steps comprising:
detecting a transmission path characteristic in communication performed by a communication device including a computer, with each of other communication devices except the communication device;
classifying a communication device out of the other communication devices into a first group when the detected transmission path characteristic satisfies a predetermined criterion, and classifying a communication device out of the other communication devices into a second group when the detected transmission path characteristic does not satisfy the predetermined criterion;
selecting a frequency band used for communication with another communication device that is a communication destination, from among a first frequency band, and a second frequency band higher than the first frequency band, based on whether the other communication device that is a communication destination is classified into the first group or into the second group, the first and second frequency bands being obtained by dividing an entire frequency band used for communication; and
performing communication with the other communication device that is a communication destination using the selected frequency band,
wherein the classifying step determines that the detected transmission path characteristic satisfies the predetermined criterion when the communication device out of the other communication devices is connected to a first breaker to which the communication device comprising the determination unit is connected, and determines that the detected transmission path characteristic does not satisfy the predetermined criterion when the communication device out of the other communication devices is not connected to the first breaker.

* * * * *